United States Patent
Huang et al.

(10) Patent No.: US 10,833,354 B2
(45) Date of Patent: Nov. 10, 2020

(54) CONDUCTIVE CARBON COATED POLYMER FOR HIGH TEMPERATURE LITHIUM ION BATTERY SHUTDOWN DEPOSITED THROUGH 3D PRINTING TECHNIQUE

(71) Applicants: Airbus Singapore Private Limited, Singapore (SG); Singapore University of Technology and Design, Singapore (SG)

(72) Inventors: Zhixiang Huang, Singapore (SG); Glenn Joey Sim, Jalan Kechubong (SG); Hui Ying Yang, Singapore (SG); Jeck Chuang Tan, Singapore (SG)

(73) Assignees: Airbus Singapore Private Limited, Singapore (SG); Singapore University of Technology and Design, Singapore (SG)

( * ) Notice: Subject to any disclaimer, the term of this patent is extended or adjusted under 35 U.S.C. 154(b) by 0 days.

(21) Appl. No.: 15/943,265

(22) Filed: Apr. 2, 2018

(65) Prior Publication Data
US 2018/0294516 A1    Oct. 11, 2018

(30) Foreign Application Priority Data
Apr. 3, 2017 (SG) .................. 10 2017 02726Q

(51) Int. Cl.
*H01M 10/05* (2010.01)
*H01M 2/14* (2006.01)
(Continued)

(52) U.S. Cl.
CPC ....... *H01M 10/0525* (2013.01); *H01M 2/145* (2013.01); *H01M 2/1673* (2013.01);
(Continued)

(58) Field of Classification Search
None
See application file for complete search history.

(56) References Cited

U.S. PATENT DOCUMENTS

| 899,553 A | 9/1908 | McNamara |
|---|---|---|
| 8,999,553 B2 | 4/2015 | Anandan et al. |

(Continued)

FOREIGN PATENT DOCUMENTS

| CN | 105585728 A | 5/2016 |
|---|---|---|
| EP | 2874215 A1 | 5/2015 |

OTHER PUBLICATIONS

European Search Report the European Application No. 18159833.5 dated Apr. 24, 2018.
(Continued)

*Primary Examiner* — Maria Laios
*Assistant Examiner* — Angela J Martin
(74) *Attorney, Agent, or Firm* — Jenkins, Wilson, Taylor & Hunt, P.A.

(57) ABSTRACT

A lithium (Li) ion battery includes a first electrode with a second electrode, and a shutdown polymer additive on an outer surface of the first electrode. The shutdown polymer additive includes at least two polyethylene layers, each polyethylene layer comprising a plurality of polyethylene microspheres. Each polyethylene microsphere is wrapped with carbon nanotubes. The polyethylene microspheres interconnect with each other such that the carbon nanotubes form a conductive network. The polyethylene layers are provided at predetermined areas of the outer surface of the first electrode.

20 Claims, 24 Drawing Sheets

(51) Int. Cl.

| | | |
|---|---|---|
| *H01M 2/16* | (2006.01) | |
| *H01M 4/13* | (2010.01) | |
| *H01M 4/36* | (2006.01) | |
| *H01M 4/58* | (2010.01) | |
| *H01M 4/62* | (2006.01) | |
| *H01M 4/66* | (2006.01) | |
| *H01M 10/42* | (2006.01) | |
| *H01M 10/0525* | (2010.01) | |
| *H01M 4/139* | (2010.01) | |
| *H01M 4/136* | (2010.01) | |
| *H01M 4/1397* | (2010.01) | |
| *H01M 4/583* | (2010.01) | |
| *H01M 10/0567* | (2010.01) | |
| *H01M 4/02* | (2006.01) | |

(52) U.S. Cl.
CPC ............ *H01M 4/13* (2013.01); *H01M 4/136* (2013.01); *H01M 4/139* (2013.01); *H01M 4/1397* (2013.01); *H01M 4/366* (2013.01); *H01M 4/583* (2013.01); *H01M 4/622* (2013.01); *H01M 4/623* (2013.01); *H01M 4/625* (2013.01); *H01M 4/661* (2013.01); *H01M 10/0567* (2013.01); *H01M 10/4235* (2013.01); *H01M 2004/021* (2013.01); *H01M 2004/027* (2013.01); *H01M 2004/028* (2013.01)

(56) References Cited

U.S. PATENT DOCUMENTS

| | | |
|---|---|---|
| 2009/0023064 A1 | 1/2009 | Kim et al. |
| 2013/0171484 A1 | 7/2013 | Baginska et al. |
| 2014/0272489 A1* | 9/2014 | Anandan ............... H01M 2/348 429/61 |

OTHER PUBLICATIONS

Database WPI Week 201660 Thomson Scientific, London, GB; AN 2016-33538F XP002779816.

European Office Action for Application No. 18159833.5 dated Oct. 30, 2019.

* cited by examiner shutdown time in relation to type of shutdown additives and their loading amount

| electrode | loading amount (mg/cm$^2$) | shutdown time (s) |
|---|---|---|
| PE-CNT printed electrode | 1.5 | 65 |
| PE-CNT DC electrode | 2.7 | 45 |
| PE-CNT DC electrode | 1.5 | 75 |
| | 2.2 | 50 |
| PE printed electrode | 1.5 | 121 |
| | 2.1 | 55 |
| PE DC electrode | 1.6 | 1470 |
| | 2.5 | 371 |

FIG. 31 electrode electrochemical impedance at 1Hz at different temperatures

| electrode | loading amount (mg/cm$^2$) | impedance (ohm) at 1 Hz | |
|---|---|---|---|
| | | 25°C | 120°C |
| electrode with no additve | 0 | 87 | 203 |
| PE-CNT printed electrode | 1.5 | 102 | 1285 |
| PE-CNT DC electrode | 1.5 | 113 | 1245 |
| PE printed electrode | 2.1 | 132 | 1450 |
| PE DC electrode | 2.5 | 144 | 1574 |

FIG. 32

CONDUCTIVE CARBON COATED POLYMER FOR HIGH TEMPERATURE LITHIUM ION BATTERY SHUTDOWN DEPOSITED THROUGH 3D PRINTING TECHNIQUE

CROSS-REFERENCE TO RELATED APPLICATION

This patent application claims priority to Singapore Patent Application SG 10 2017 027 26Q filed Apr. 3, 2017, the entire disclosure of which is incorporated by reference herein.

TECHNICAL FIELD

The disclosure herein relates to a lithium ion battery (LIB). In particular, it relates to a lithium ion battery with an improved electrode.

BACKGROUND

Currently, the lithium ion battery is the leading choice of electrical energy storage for small portable devices and it has a great potential for large-scale implementation in electric vehicles. Wide adoption of the lithium ion battery does not solely depend on energy density of its electrode material. Safety of the lithium ion battery is also a key concern.

Put differently, lithium ion battery safety is of great importance for the lithium ion battery to be widely used in systems of different scales.

The lithium ion battery is susceptible to thermal failure that results in catastrophic events due to use of combustible electrolyte in the lithium ion battery. The thermal failure, commonly known as thermal runaway, can be triggered by overheating, overcharging, or short-circuiting of the battery. The thermal runaway begins when the battery reaches a critical temperature (approximately 150 degree Celsius) resulting in an exothermic reaction between a cathode and an electrolyte of the battery. This reaction then results in a build-up of cell temperature and pressure that triggers further exothermic reaction as the electrolyte breaks down. The battery then may catch fire or even explodes.

Because of this, commercial lithium ion batteries include several safety mechanisms, namely internal and external safety devices. Examples of the external safety devices include safety vents, electronic circuit breakers, and thermal fuses. On the other hand, the internal safety devices mainly comprise shutdown separators that are made from positive temperature coefficient (PTC) polymers. These polymers melt at high temperature to limit ion transport between electrodes of the battery.

However, the external safety devices may not be able to respond in time to thermal runaway events, which can occur as soon as a minute, after a short circuit of the battery. On the other hand, the internal shutdown separators are prone to shrinkage resulting in short-circuiting of the electrodes.

Numerous reports, in patent and academic literature, teach the use of shutdown additives such as heat sensitive polymers for electrodes of the lithium ion battery. Examples of such additives are paraffin, polyethylene, and polyolefin, which have melting temperatures between 60 to 200 degree Celsius.

The polymers are deposited either by mixing with an electrode active material during preparation of the electrode or by casting on a surface of the electrode directly with an aid of a binder.

Since these polymers are electrically insulating, the deposition process often includes addition of conductive agents, such as carbon, to these polymers.

When large quantities of the polymer are added to the cathode, overall energy density of the lithium ion battery can be significantly reduced.

Researchers also work on improving the intrinsically insulating polymers for improving performances of the lithium ion battery.

Other reports teach about other types of additives for improving safety of lithium ion batteries. These additives include flame-retardant electrolyte additives, electrolyte that thermally cross links, and active material particle coating.

U.S. Pat. No. 8,999,553B2 discloses a lithium ion battery comprising an anode, a cathode, a separator that is placed between the anode and the cathode, and a shutdown layer. The shutdown layer is placed either between the separator and the anode or between the separator and the cathode. The shutdown layer includes a low melting point material and a conductive material. The conductive material is provided within the low melting point material to form a conductive network within the shutdown layer. At a melting point of the low melting point material, the conductive network is reduced such that at least a portion of the shutdown layer is substantially electrically non-conductive.

US20130171484A1 shows an autonomous battery shutdown system, which includes a battery. The battery includes an anode, a cathode, and an electrolyte composition that is provided between the anode and the cathode. The electrolyte composition includes an ionically conductive liquid that contains lithium ions, and temperature-sensitive particles. The temperature-sensitive particles include a polymer with a melting point that is between 60° C. and 120° C. When the temperature of the battery exceeds 120° C., the temperature-sensitive particles form an ion barrier that traverses the battery.

US20090023064A1 discloses an electrochemical device with an electrode. The electrode comprises electrode active material particles, conductive particles, a binder, and wax. The electrode active material particles are interconnected by a network of the conductive particles. The wax, which has a low meting viscosity, partially or entirely fixes paths of the conductive particles.

SUMMARY

It is an object of this application to provide an improved lithium ion battery.

The application provides an improved lithium (Li) ion battery. The Li ion battery is intended to generate electrical energy through chemical reactions.

The improved Li ion battery includes a first electrode with a second electrode. The electrodes act as electrical conductors for contacting with an electrolyte of the Li ion battery to form an electrical path. The electrical path allows Li ions to move between the electrodes via the electrolyte.

The battery further includes a shutdown polymer additive, which is provided or deposited onto an active outer surface of the first electrode. The shutdown polymer additive acts to stop the Li ion battery from operating so as to prevent the Li ion battery from reaching a thermal runaway temperature. The thermal runaway temperature is approximately 150 degree Celsius.

At the thermal runaway temperature, an exothermic reaction between the electrodes of the battery can occur. This can lead to a build-up of battery temperature and pressure that triggers further exothermic reaction. The battery then may catch fire or even explode.

The shutdown polymer additive includes two or more polyethylene (PE) layers.

Each PE layer includes a plurality of PE microspheres. Each microsphere has a general shape of a spherical shell with a very small diameter usually in the micron or nanometre range.

Each PE microsphere is wrapped with electrically conductive carbon nanotubes (CNT). Put differently, the PE microspheres are coated with the CNT.

Furthermore, the PE microspheres interconnect with each other such that the CNT form a conductive network. The PE microspheres are placed next to each other and they contact or touch each other, thereby allowing the CNT to form the conductive network. The conductive network is intended for allowing Li ions to pass through.

The PE layers are provided at respective predetermined areas of the active outer surface of the first electrode.

The shutdown polymer additive provides an operating mode and a shutdown mode.

In the operating mode, the temperature of the battery is below the melting temperature of the PE. In other words, the PE microspheres are in a solid state. The PE is also selected because its melting temperature is below the battery thermal runaway temperature.

The conductive network allows the lithium ions to pass through the conductive network for moving between the first electrode and the second electrode.

In detail, some areas of the active outer surface of the first electrode are covered by the PE layers while the other areas are not covered. Li ions then move between the covered surface of the first electrode and the second electrode via the conductive networks of the PE layers. Li ions also move between the uncovered surface of the first electrode and the second electrode without passing through the PE layers.

In effect, the PE layers do not essentially hinder the movement of the Li ions. In other words, the PE layers essentially do not impact the performance of the Li ion battery.

In the shutdown mode, the temperature of the battery is at or above the melting temperature of the PE. The PE layers then melt to form essentially one insulating film.

The insulating film does include the conductive network. The network is disrupted or broken such that it does not provide an electrical conductive path for the Li ions.

The positions of the PE layers are selected such that when the PE layers melt, they can join with each other to form a single film or layer.

The insulating film later covers the active outer surface of the first electrode. After this, the insulating film prevents the Li ions from moving between the first electrode and the second electrode. In other words, charging or discharging of the Li ion battery is impeded.

The temperature of the battery is then prevented from reaching the battery thermal runaway temperature, where battery can catch fire or explode.

This improved Li ion battery provides several advantages.

The PE layers do not essentially affect performance of the battery while preventing the battery from reaching the battery thermal runaway temperature.

The PE layers can be separated from each other by a predetermined distance. The predetermined distance allows, in the shutdown mode, the PE layers to be placed apart and yet close enough such that the molten PE layers can extend to form one insulating film.

In one implementation, the first electrode includes a cathode while the second electrode includes an anode. The shutdown polymer additive is deposited on the cathode.

In another implementation, the first electrode includes an anode while the second electrode includes a cathode. The shutdown polymer additive is deposited on the anode.

In a general sense, the shutdown polymer additive can be placed on a cathode, an anode, or on both a cathode and an anode.

The PE layer can have a shape of a disc for easy production.

The PE layers can be arranged in an array or be placed in an orderly arrangement for covering the outer surface in an easy placement.

The PE layer can also include a binder, such as polyvinylidene fluoride, for fastening or holding the PE microspheres together. The binder holds the PE microspheres together allowing the carbon nanotubes of the PE microspheres to connect with each other to form a conductive network.

The application also provides a method for producing a Li ion battery.

The method includes a step of providing a first electrode and a second electrode. A shutdown polymer additive is then provided. The shutdown polymer additive is later loaded into a syringe, which can be actuated by compressed air. The syringe is then moved with a programmable robotic arm to predetermined locations. The syringe afterward deposits a predetermined amount of the shutdown polymer additive on at least two predetermined positions of an outer surface of the first electrode. The predetermined positions are selected such that, in a shutdown mode, the deposited shutdown polymer additive forms essentially one insulating film for preventing the Li ions from moving between the first electrode and the second electrode.

The shutdown polymer additive can be provided by a process, which comprises a step of forming polyethylene (PE) microspheres from polyethylene pellets using a solvent evaporation method. The surfaces of the PE microspheres are then treated or cleaned with oxygen plasma for reducing their hydrophobicity. The treated PE microspheres are later coated with a positively charged functional group, such as poly(diallyldimethylammonium chloride)(PDDA). The positively charged PE microspheres are afterward coated with negatively charged carbon nanotubes (CNT-COOH).

The provision of the shutdown polymer additive can further include treating the carbon nanotubes with carboxylic acid.

In summary, the application provides an improved cathode for a lithium ion battery. The improved cathode includes a shutdown additive, which is deposited directly onto a surface of the cathode. The shutdown additive includes heat sensitive polymer microspheres, which comprise polyethylene (PE) that are wrapped by conductive carbon nanotubes (CNT). The CNT wrapped PE microspheres provide a shutdown mechanism, wherein the CNT wrapped PE microspheres melt at a temperature of about 113° C. to form a non-conductive layer on the cathode for blocking or hindering ion transport between the electrodes of the battery and, thereby impeding charging and discharging of the lithium ion battery.

The additive acts as a safety device for responding rapidly, within a duration of not more than one minute approximately, to a thermal runaway event of the lithium ion battery. The safety device also has a minimal or little to no negative influence on operating performances of the battery, such as energy density, cycle life, and operating temperature.

The application provides a method for producing an improved lithium ion battery. The method adapts 3D printing technology for precise and improved deposition of the shutdown additive on a cathode of the lithium ion battery. The method includes a step of mixing CNT wrapped PE microspheres with solvents and a binder to form a slurry ink or paste. The paste is then loaded or deposited into a syringe. After this, a programmable robotic arm moves the syringe and deposits the paste onto a surface of the cathode of the battery.

BRIEF DESCRIPTION OF THE DRAWINGS

FIG. 31 illustrates a table showing shutdown times of lithium ion batteries, which are provided with electrodes that are deposited with different shutdown additives and with different loading amounts; and FIG. 32 illustrates a table showing electrochemical impedance of the electrodes of the coin cells of FIG. 29 at different temperatures.

DETAILED DESCRIPTION

In the following description, details are provided to describe embodiments of the application. It shall be apparent to one skilled in the art, however, that the embodiments may be practiced without such details.

Some parts of the embodiments have similar parts. The similar parts may have the same names or the similar part numbers with an alphabet symbol. The description of one similar part also applies by reference to another similar part, where appropriate, thereby reducing repetition of text without limiting the disclosure.

Figure 1:
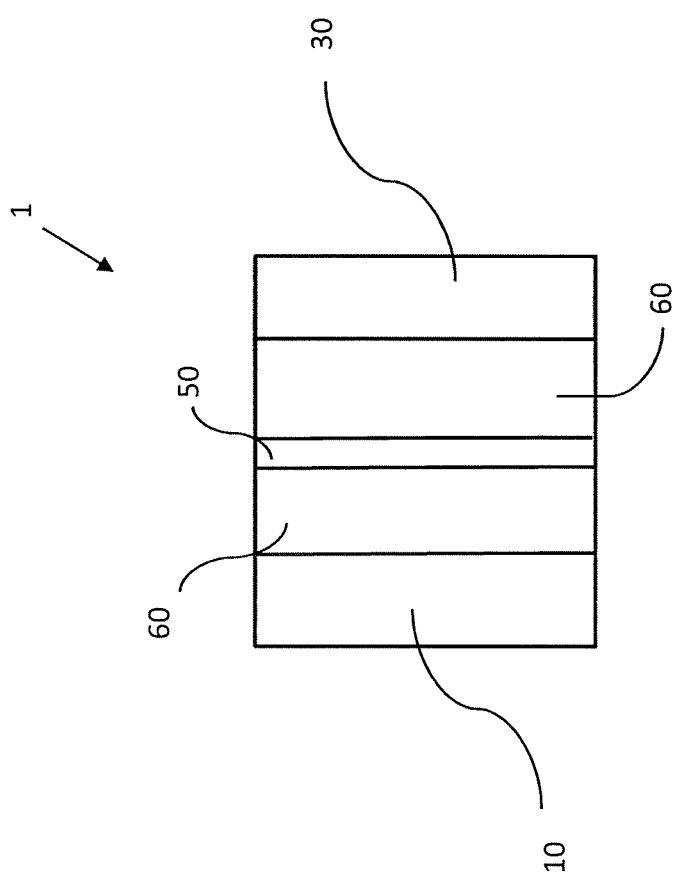
FIG. 1 illustrates a schematic side view of a lithium ion battery.

FIG. 1 shows an improved lithium ion battery 1. The lithium ion battery 1 includes an improved cathode 10, an anode 30, a membrane 50, and an electrolyte 60. The membrane 50 separates the cathode 10 from the anode 30. The cathode 10, the anode 30, and the membrane 50 are submerged in the electrolyte 60.

Figure 2:
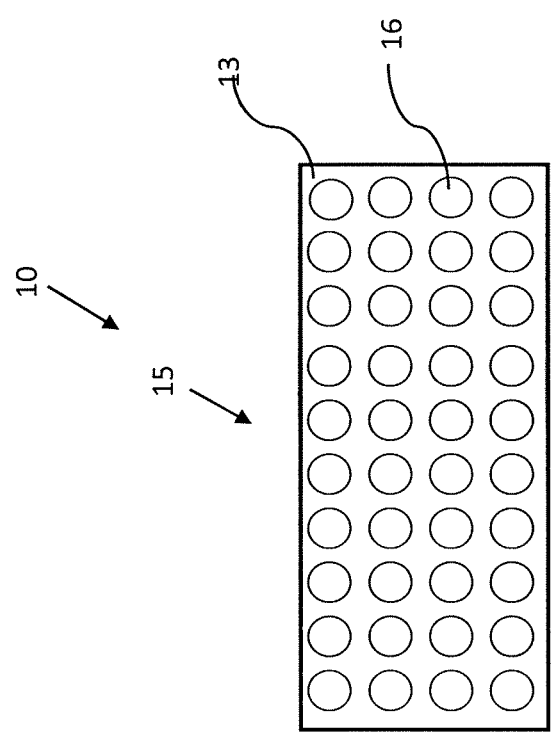
FIG. 2 illustrates a schematic view of an improved electrode of the battery of FIG. 1, wherein the improved electrode is deposited with a shutdown additive, which comprises polyethylene (PE) microspheres that are coated with carbon nanotubes (CNT) (PE-CNT microspheres), in a pattern of regular arrays of additive dots using a 3D printing technique.

Referring to FIG. 2, the improved cathode 10 includes a cathode current collector, which is covered with cathode active material 13, and an improved shutdown separator 15. The shutdown separator 15 is placed on a surface of the cathode active material 13.

The cathode current collector includes a conductive substrate such as a foil made of aluminium, nickel, or combination thereof. The cathode active material 13 includes lithium iron phosphate (LiFePO4).

The improved shutdown separator 15 includes a plurality of additive dots 16. The additive dots 16 are deposited onto the entire surface of the cathode active material 13 in a pattern of regular arrays, wherein the neighboring additive dots 16 are separated from each other by a predetermined distance.

Each additive dot 16 includes a binder and a shutdown additive. The binder includes polyvinylidene fluoride (PVDF). The shutdown additive includes a plurality of temperature sensitive porous polyethylene (PE) microspheres that are coated or wrapped by carbon nanotubes (CNT). The PE microspheres have an electrically insulating or nonconductive property while the carbon nanotubes have an electrically conductive property.

The PE microspheres have a melting point that is above operating temperatures of lithium ion batteries but is below 120 degree Celsius. In one implementation, the PE microspheres have a melting point of approximately 113 degree Celsius.

Referring to other parts of the lithium ion battery 1, the anode 30 includes an anode current collector, which is covered with anode active material. The anode current collector includes a conductive substrate while the anode active material includes graphite. The electrolyte 60 includes a mixture of lithium hexafluorophosphate (LiPF6), ethylene carbonate (EC), and dimethyl carbonate (DMI). The membrane 50 is made of polyethylene and polypropylene.

In use, the lithium ion battery 1 can operate in a discharge mode and in a charge mode.

In the discharge mode, the anode 30 and the cathode 10 are electrically connected to an external load that receives electrical energy from the battery 1. The cathode active material 13 then releases lithium ions. The lithium ions later move from the cathode 10, through the electrolyte 60, through the membrane 50, through the electrolyte 60, and to the anode 30. The lithium ions afterward attach to the anode 30.

In the charge mode, the anode 30 and the cathode 10 are electrically connected to an electrical source that provides electrical energy to the battery 1. The lithium ions move from the anode 30, through the electrolyte 60, through the membrane 50, through the electrolyte 60, and to the cathode 10 to form chemically the cathode active material 13.

At normal operating temperature, the PE microspheres are in a solid state. The conductive carbon nanotubes, which are coated on the surfaces of the PE microspheres, form an electrically conductive network between the PE microspheres. The conductive network serves to allow lithium ions to move to the cathode current collector or away from the cathode current collector. Put differently, the conductive network allows ion transport between the cathode 10 and the anode 30.

When a short circuit in the battery 1 occurs, the internal temperature of the battery 1 increases. The PE microspheres prevent the battery 1 from reaching a critical temperature, wherein the battery 1 catches fire or even explodes.

Before the battery internal temperature reaches this critical temperature, the PE microspheres melt and change from a solid state to a liquid state. The conductive network is disrupted or broken, thereby disrupting the ion transport between the two electrodes 10 and 30.

The melted PE microspheres later form a film to cover the surface of the cathode active material 13. The film, which is an electrically insulating layer, prevents lithium ions from moving between the electrodes 10 and 30. This hence impedes the charging or discharging of the battery 1. The battery then stops operating or shuts down, thereby preventing the battery from reaching the critical temperature.

Figure 3:
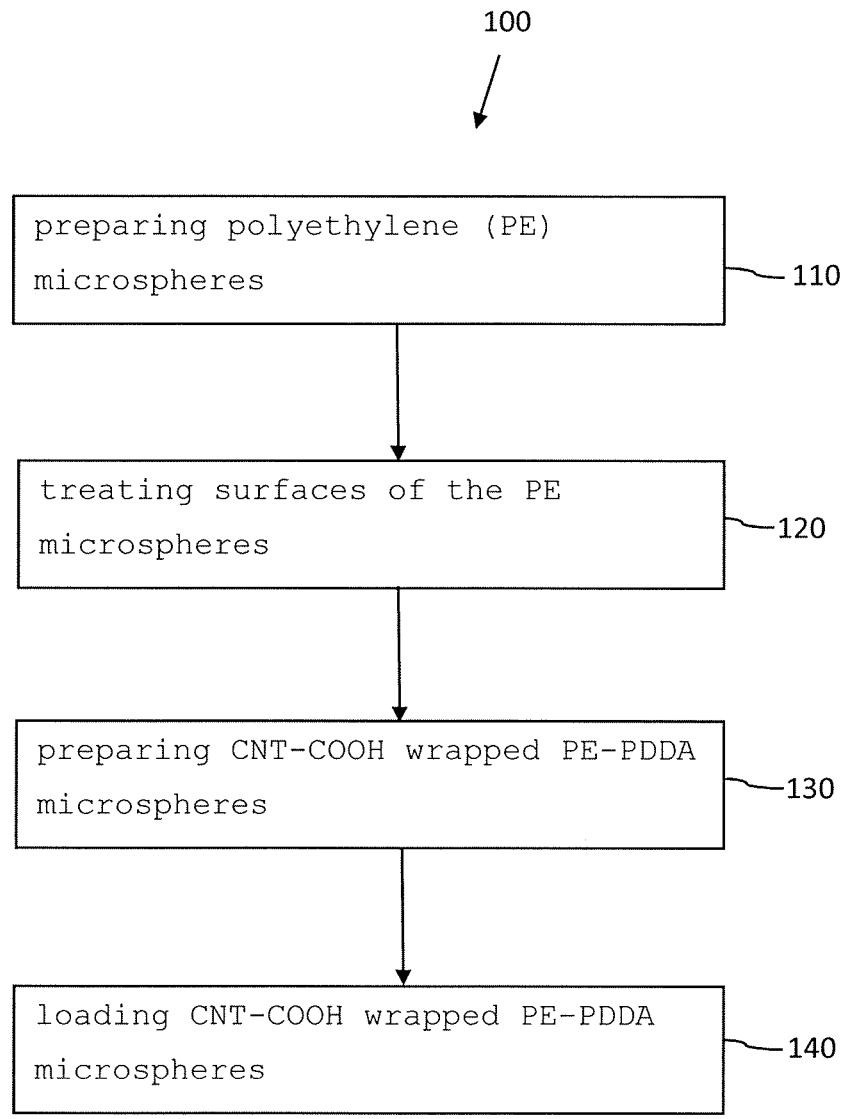
FIG. 3 illustrates a flow chart of a method for producing the improved electrode of FIG. 2.

FIG. 3 shows a flow chart 100 of a method for producing the improved cathode 10 of the battery 1, which is described below.

The method includes a step 110 of preparing polyethylene (PE) microspheres. Following this, surfaces of the PE microspheres is treated, in a next step 120. CNT-COOH wrapped PE-PDDA microspheres is prepared in a further step 130. The CNT-COOH wrapped PE-PDDA microspheres is then loaded onto the cathode 10, in a step 140.

The step 110 of preparing the polyethylene (PE) microspheres is described below.

The step 110 includes preparing the PE microspheres using a solvent evaporation method. The solvent evaporation method includes a step of preparing two solutions. One solution is prepared by dissolving 2 grams of polyethylene (PE) in 15 milliliters (ml) of xylene at 85 degree Celsius. A surfactant solution is then prepared by mixing 1 part of Brij S10 at 1 percent by weight (wt %) with 1 part of Sodium dodecyl sulfate (SDS) at 1 wt %.

Thereafter, the dissolved PE solution is poured into 40 ml of the surfactant solution under constant agitation by a homogenizer at 20,000 revolutions per minute (rpm) and is heated at 90 degree Celsius. This agitation is done for 60 minutes. Halfway through the agitation, 20 ml of surfactant solution is added to the agitated solution. PE microspheres are then formed by precipitation. These PE microspheres are then collected and washed using a vacuum filtration system.

The step 120 of treating surfaces of the PE microspheres is described below.

The surface treatment is carried out through treating the PE microspheres with Oxygen Plasma. The treated PE microspheres are then coated with poly(diallyldimethylammonium chloride) (PDDA).

In detail, 1 gram of the PE microspheres is first loaded onto a glass Petri dish. The dish is later inserted into a chamber of a tabletop Plasma cleaner. Next, a step of treating the PE microspheres is performed. This step includes operating a vacuum pump for 2 minutes to remove atmospheric air from the chamber. Oxygen plasma treatment using atmospheric air is then performed for 2 minutes. The treatment step is repeated for 5 times. The oxygen treated PE microspheres (1 gram) are then stirred in a solution mixture that is formed by 100 ml of PDDA (20 wt % in water) for 48 hours to provide a PDDA coating on the PE microspheres. The PDDA coated PE microspheres (PE-PDDA) are then collected using the vacuum filtration system. Excess PDDA is then washed off using distilled (DI) water.

The step 130 of preparing CNT-COOH wrapped PE-PDDA microspheres is described below.

A probe sonicator is used to disperse 52 milligrams of carboxylic acid treated carbon nanotubes (CNT-COOH) in 500 milliliters of DI water. Thereafter, 1 gram PE-PDDA microspheres are added to the dispersed CNT-COOH solution. The PE-PDDA microspheres are later mixed in the solution for 48 hours in order for the CNT-COOH to wrap around the PE-PDDA microspheres. The CNT-COOH wrapped PE-PDDA microspheres—PE-CNT powder—are afterward collected using the vacuum filtration system.

The step 140 of loading or depositing of the CNT-COOH wrapped PE-PDDA microspheres onto the cathode 10, wherein these microspheres serve as an additive, is described below.

The CNT-COOH wrapped PE-PDDA microspheres can be loaded using either a 3D printing technique or a drop casting method.

The loading of the CNT-COOH wrapped PE-PDDA microspheres using a 3D printing technique is described below.

The PE-CNT powders are mixed with polyvinyl difluoride (PVDF) and with N-Methyl-2-pyrrolidone (NMP) solvent, in a ratio of 0.27:0.03:0.7 by weight, to produce a viscous slurry. Put differently, the mixture contains 27 wt % of the PE-CNT powders. The mixture is then stirred for 72 hours. The stirring is needed to ensure a well-mixed slurry for subsequent dispensing using a syringe dispenser with a needle with a gauge number of between 18 to 21.

The slurry containing the CNT-COOH wrapped PE-PDDA microspheres are later deposited onto lithium iron phosphate (LiFePO4) electrodes, which has a 12-millimetre diameter, through a syringe dispenser, wherein a robotic arm is programmed to move the syringe dispenser for the depositing of arrays of slurry dots over the electrode.

Control samples are also made using PE-PDDA microspheres slurry, contains 27 wt % PE-PDDA, which are prepared in the same manner as described above. This slurry is then deposited onto electrodes using the syringe dispenser, wherein the robotic arm is programmed to deposit arrays of slurry dots over the electrode.

The loading of the CNT-COOH wrapped PE-PDDA microspheres using a drop casting method is described below.

A less viscous slurry is prepared for this drop casting of PE-CNT and PE-PDDA control samples. The slurry is formed by mixing a polymer additive—either PE-CNT additive or PE-PDDA additive—with PVDF binder and NMP solvent. The ratio of the polymer additive to PVDF and to NMP is 0.09:0.01:0.9 by weight. Put differently, the mixture contains 10 wt % of the polymer additive. The slurry is then drop casted onto lithium iron phosphate (LiFePO4) electrodes using a micropipette, wherein the slurry is casted directly onto a surface of the electrodes.

Steps for electrochemical characterization and coin cell fabrication are described below.

The lithium iron phosphate (LiFePO4) electrodes, which are loaded with either the PE-CNT microspheres or the PE-PDDA microspheres, are used as cathodes in a two-electrode full-cell configuration, wherein graphite acts as an anode.

In a case of a coin cell battery, all working electrodes are dried at 80 degree Celsius for 12 hours. The assembly of the coin cell battery is then done in an Argon (Ar)-filled glove box, wherein the battery includes a standard CR2032 cell case, a Celgard 2325 membrane that is sandwiched between its cathode and anode, as well as an electrolyte, which is a mixture of 1 mole (M) of lithium hexafluorophosphate (LiPF6) solution in Ethylene Carbonate (EC)/Di-Methyl Carbonate (DMC), 1:1 v/v. The fabricated and assembled coin cells are then rested for 24 hours.

After this, the electrochemical characterization is performed by conducting charge-discharge testing of the coin cells using a Neware Battery tester. Electrochemical impedance spectroscopy (EIS) measurements of the coin cells are later performed using a multi-channel potentiostat, such as Biologic VMP3.

Steps for characterization of the improved shutdown polymer is described below.

The embodiment provides an improved additive with reduced impedance through wrapping of conductive carbon nanotubes (CNT) around PE. The embodiment also provides an improved method that adopts a printing technique for precise and optimal or desired deposition of the additive, thereby reducing the amount of additive required to achieve rapid shutdown of the lithium ion battery.

The embodiment is different from publications that disclose rapid shutdown of lithium ion batteries at hazardous temperatures of above 150 degree Celsius, in less than one minute, using heat sensitive polymer additive. However, this requires high loading of more than 20 mg/cm$^2$ of the insulating polymer additive onto electrodes of the lithium ion batteries. This causes deterioration of battery performance during its normal operation. Moreover, the electrochemically inactive additive also leads to a significant decrease of effective energy density of the lithium ion battery.

The commercially purchased polyethylene (PE) in the form of millimetre size pellets. They require further processing to reduce their size to microspheres, to facilitate subsequent wrapping of the PE microspheres with carbon nanotubes, and to facilitate deposition of the CNT wrapped PE microspheres onto lithium iron phosphate (LiFePO4) electrodes.

The processing is done using a solvent evaporation method. PE pellets are firstly dissolved in heated xylene. The dissolved solution of PE and xylene is then poured into a heated mixture of Brij S10/SDS surfactant in distilled water (DI H2O) under constant agitation by a homogenizer. PE microspheres are later formed by precipitation. It should be noted that high-speed agitation is necessary for successful formation of small microspheres. This is because high-speed agitation drives Brij S10/SDS surfactant into small micelles that encapsulate the dissolved PE.

Figure 4:
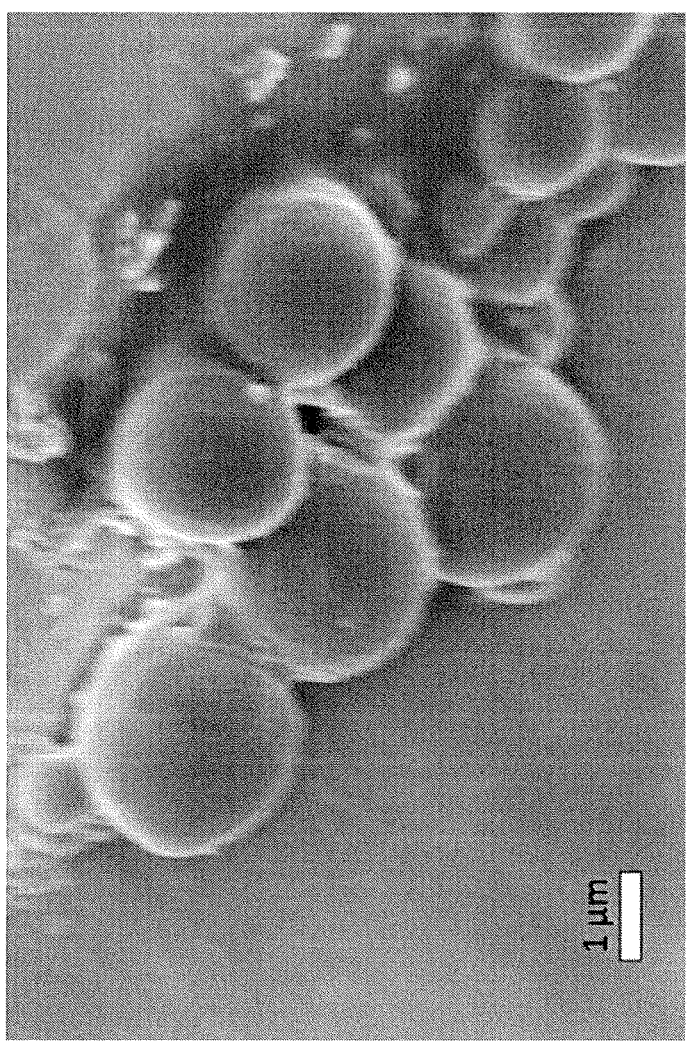
FIG. 4 illustrates a scanning electron microscope (SEM) image of the PE-CNT microspheres of the shutdown additive of the electrode of FIG. 2.

In one implementation, as observed under a scanning electron microscope (SEM), the PE microspheres are spherical in shape with smooth surfaces. The microspheres have a diameter of about 1 micrometer to about 3 micrometers, which is shown in FIG. 4.

The PE microspheres are further treated by coating it with positively charged functional groups, which act to facilitate effective wrapping of negatively charged CNT-COOH around the PE microspheres.

In detail, firstly, the PE microspheres are treated using oxygen plasma to reduce their hydrophobicity. The oxygen treated PE microspheres are then mixed in a solution of PDDA for providing a positively charged PDDA coating on surfaces of PE microspheres.

Figure 5:
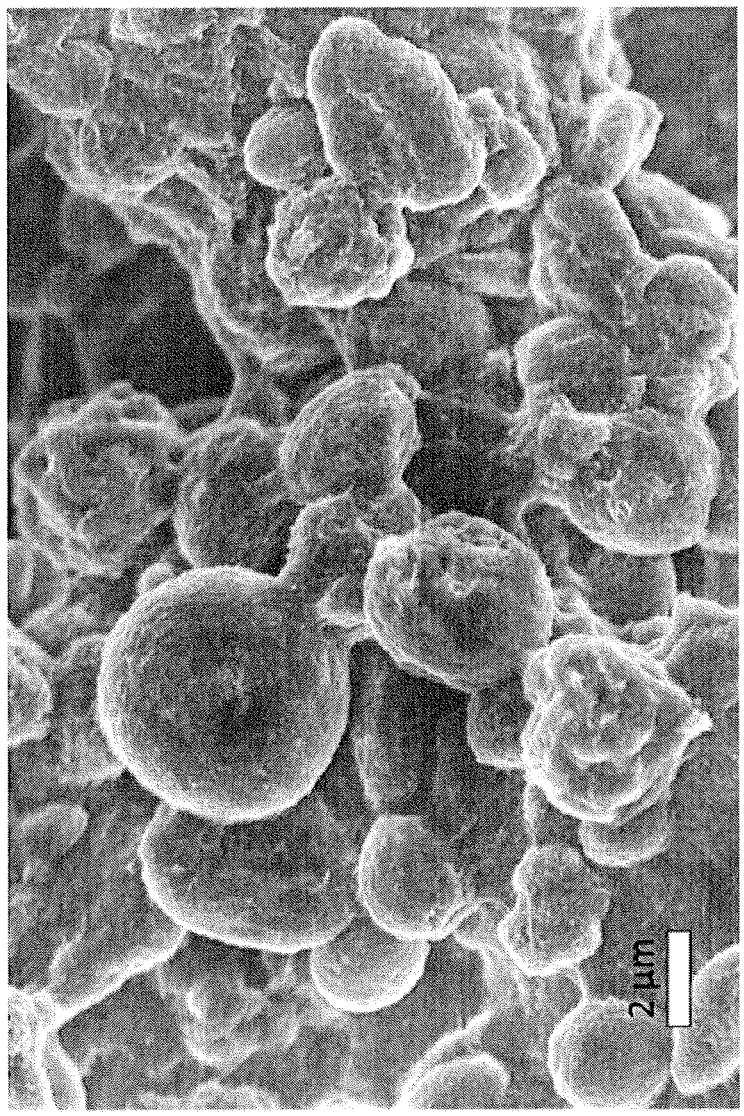
FIG. 5 illustrates another SEM image of the PE-CNT microspheres of FIG. 4.
Figure 6:
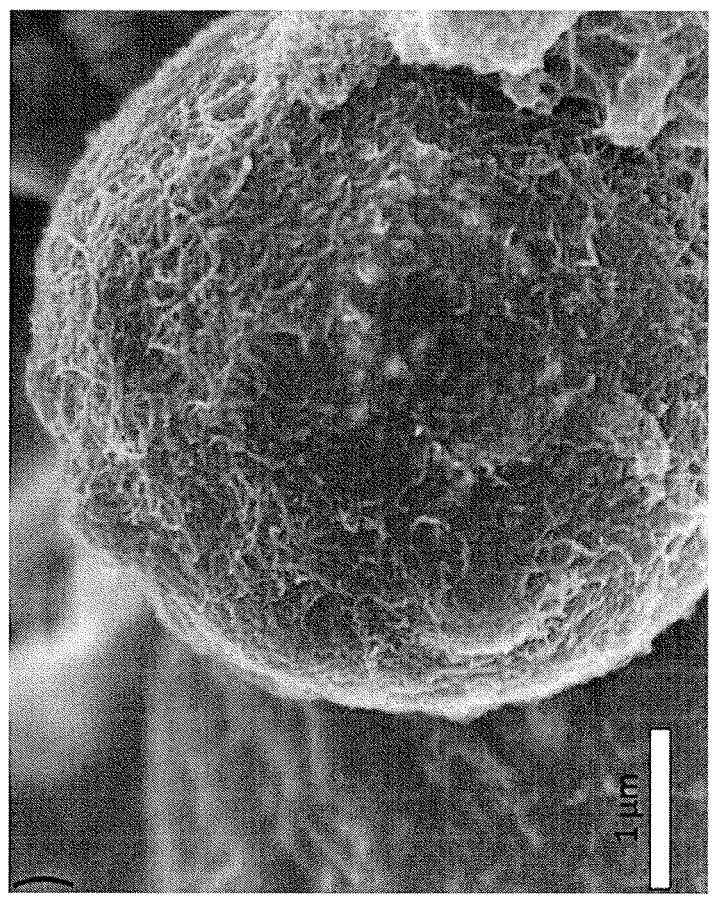
FIG. 6 illustrates a SEM image of one of the PE-CNT microspheres of FIG. 4.

The PDDA coated PE microspheres are later mixed in a solution of carboxylic acid treated carbon nanotubes (CNT-COOH), which are negatively charged. The negatively charged CNT-COOH and the positively charged PDDA coated PE microspheres then attach to each other through electrostatic attraction, thereby allowing the CNT-COOH to wrap around the PE microspheres. FIGS. 5 and 6 show morphology of the CNT-COOH wrapped PE microspheres (PE-CNT microspheres).

Apart from forming a tight wrapping around the PE microspheres, the carbon nanotubes also form an electrically conductive network among the PE microspheres. The obtained additive powders of PE-CNT microspheres are then mixed with PVDF and NMP solvent to form a slurry or paste to facilitate the deposition of the additive onto the electrode.

In order to achieve an optimal or a predetermined amount of loading of the additives onto an electrode with high precision, a 3D printing technique is adopted. The 3D printing technique utilizes a programmable robotic arm with a syringe and utilizes compressed air to actuate the syringe for depositing the slurry.

In this manner, the 3D printing technique also enables the additive to be deposited onto the electrode in a pattern of regular arrays of half spherical dots. The neighboring or adjacent dots are separated from each other by essentially the same distance.

Furthermore, the loading amount of the additives can also be controlled by using varying gauge or width of a syringe needle.

For purpose of comparison, control samples can be made by depositing the additives using the drop casting method as described above.

Figure 7:
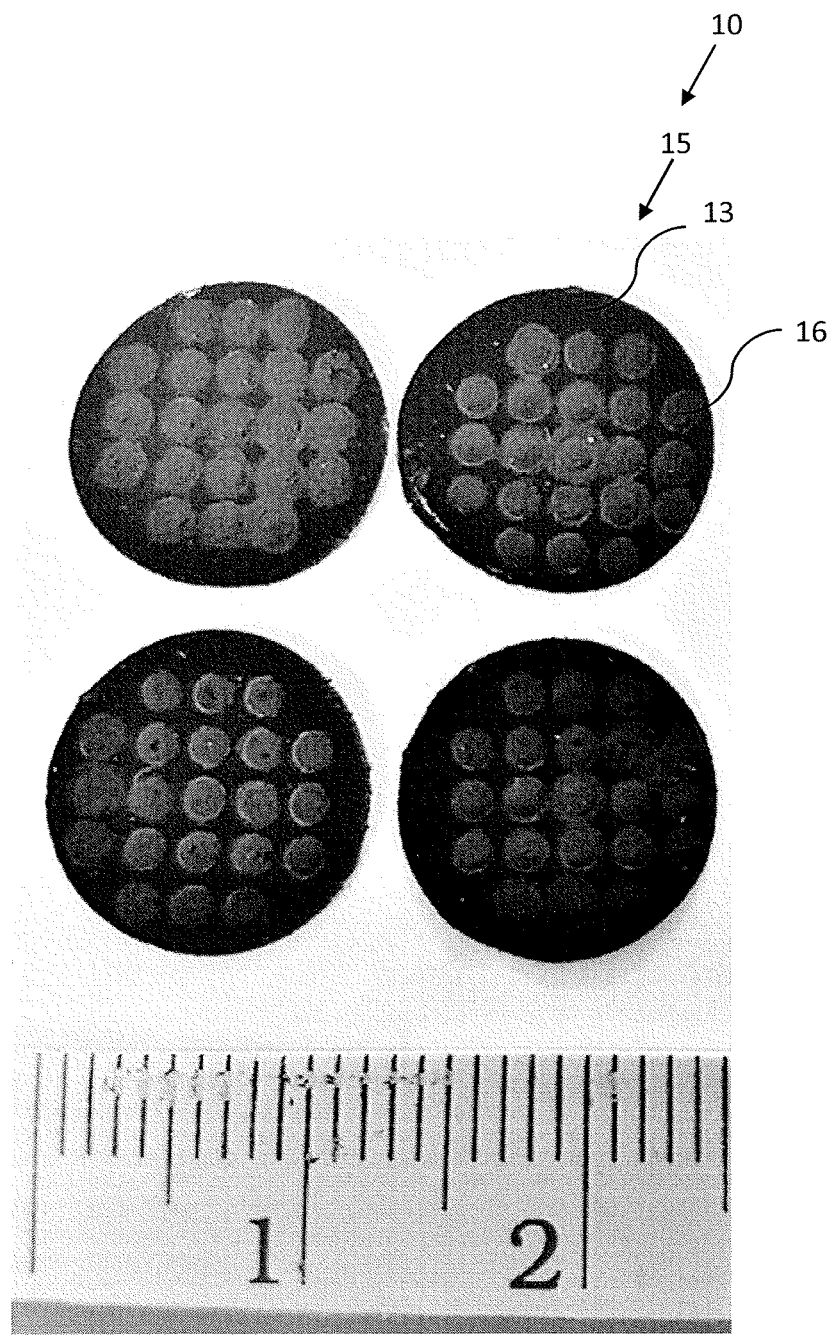
FIG. 7 illustrates a top view of several improved electrodes of FIG. 2.
Figure 8:
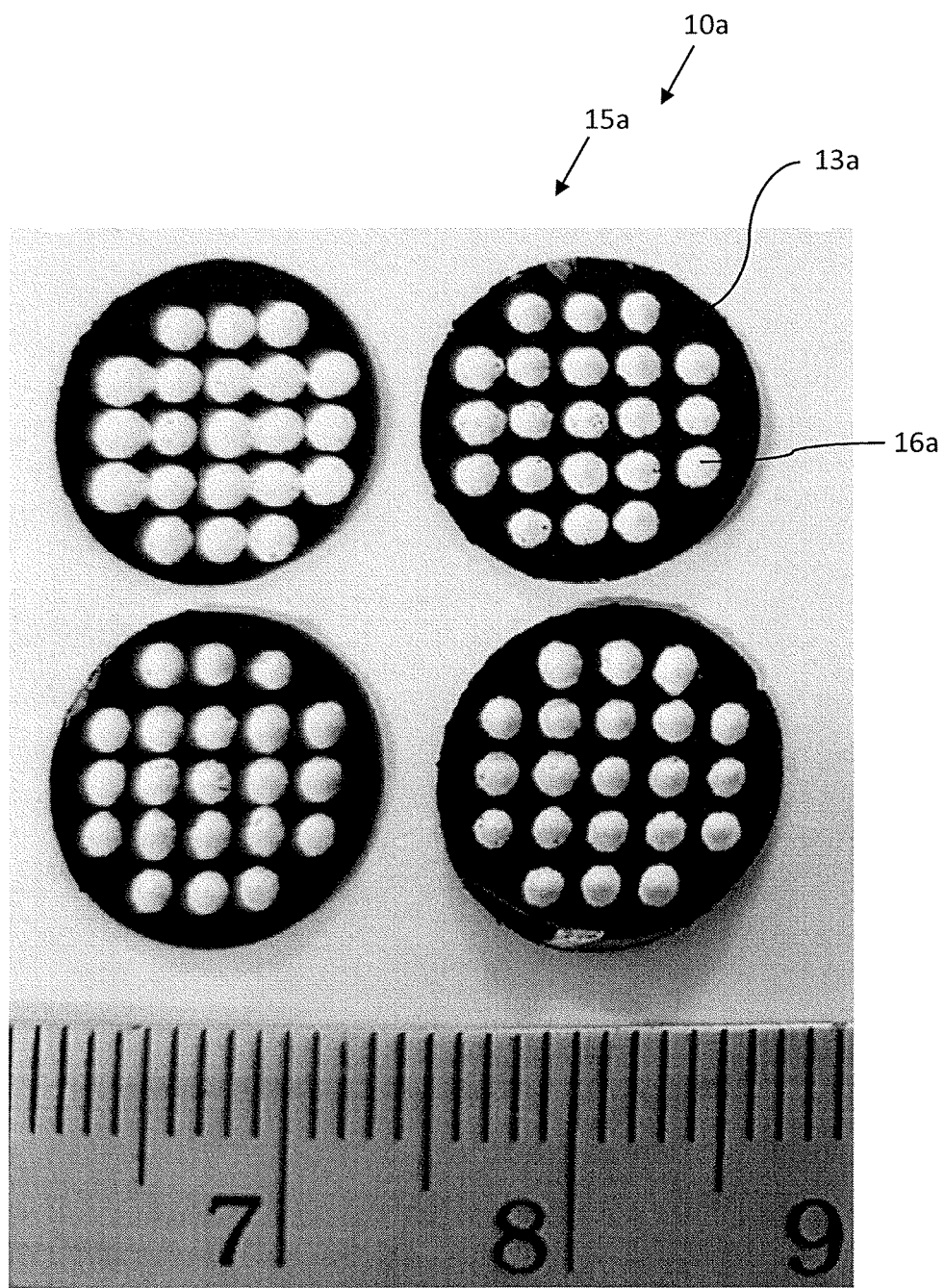
FIG. 8 illustrates a top view of several electrodes, wherein each electrode is deposited with an additive, which comprises polyethylene (PE) microspheres, in a pattern of regular arrays of additive dots using the 3D printing technique.
Figure 9:
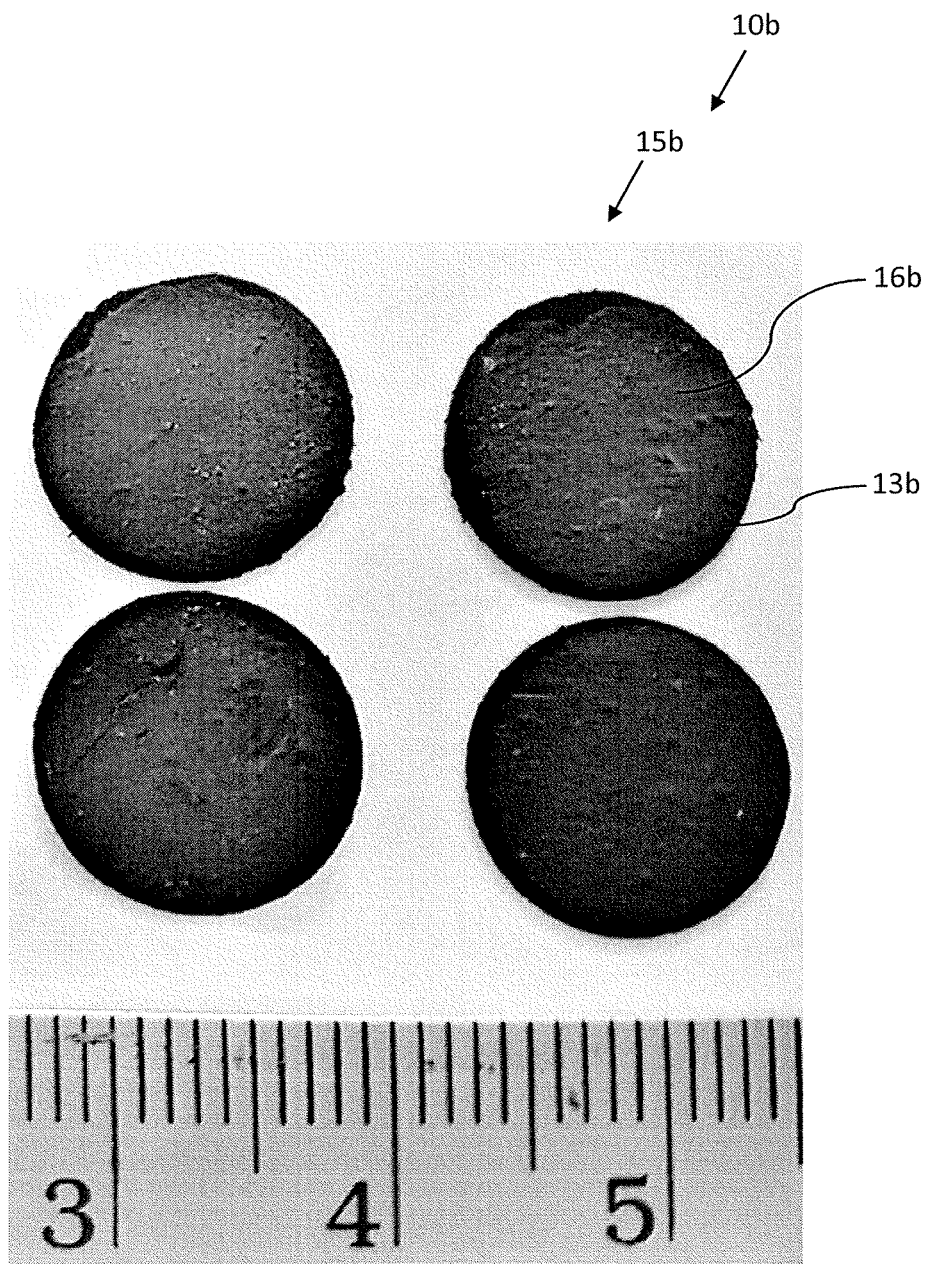
FIG. 9 illustrates a top view of several electrodes, wherein each electrode is deposited with an additive, which comprises PE-CNT microspheres, using a drop casting technique.
Figure 10:
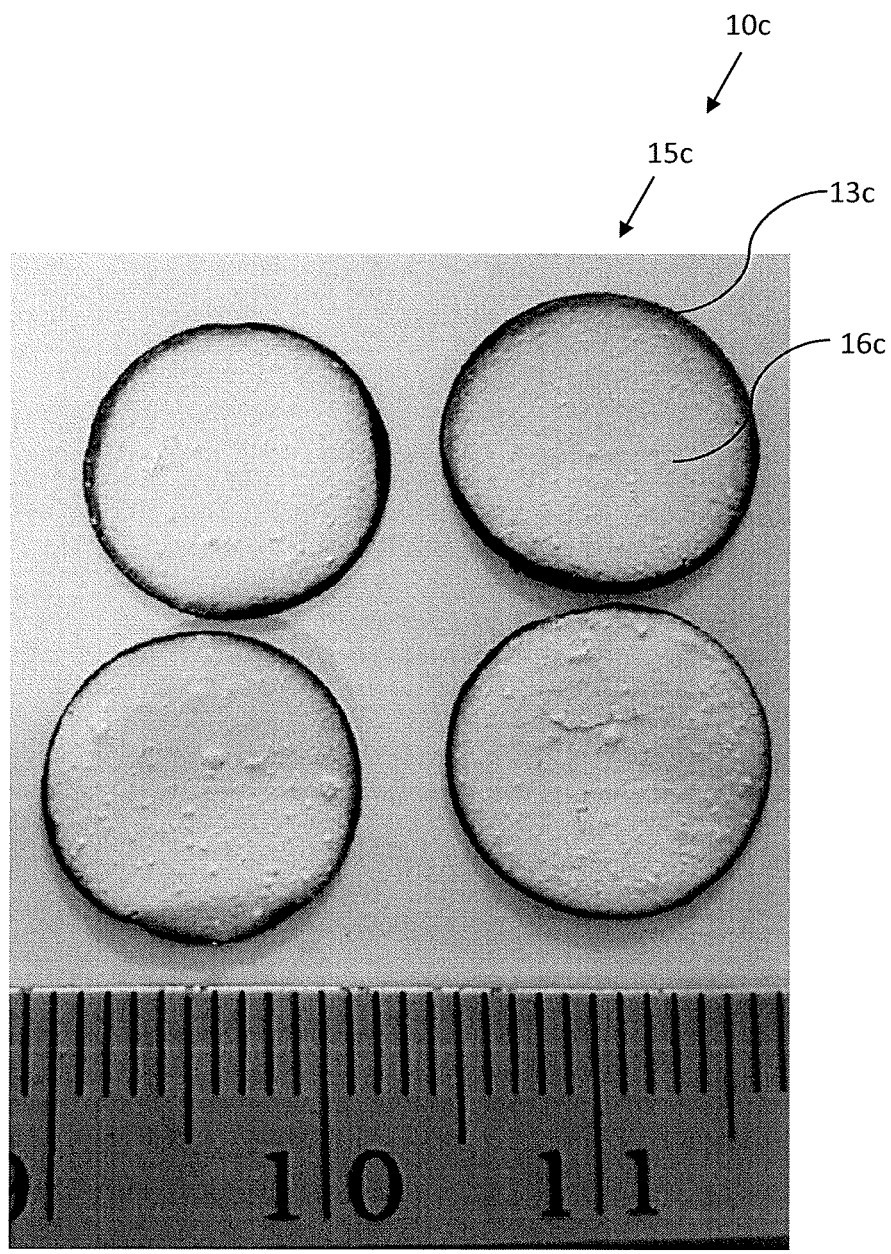
FIG. 10 illustrates a top view of several electrodes, wherein each electrode is deposited with an additive, which comprises PE microspheres, using the drop casting technique.

FIGS. 7 and 8 show electrodes with different additives, which are deposited using the 3D printing technique while FIGS. 9 and 10 show electrodes with different additives, which are deposited using the drop casting method.

Figures 11, 12, 13:
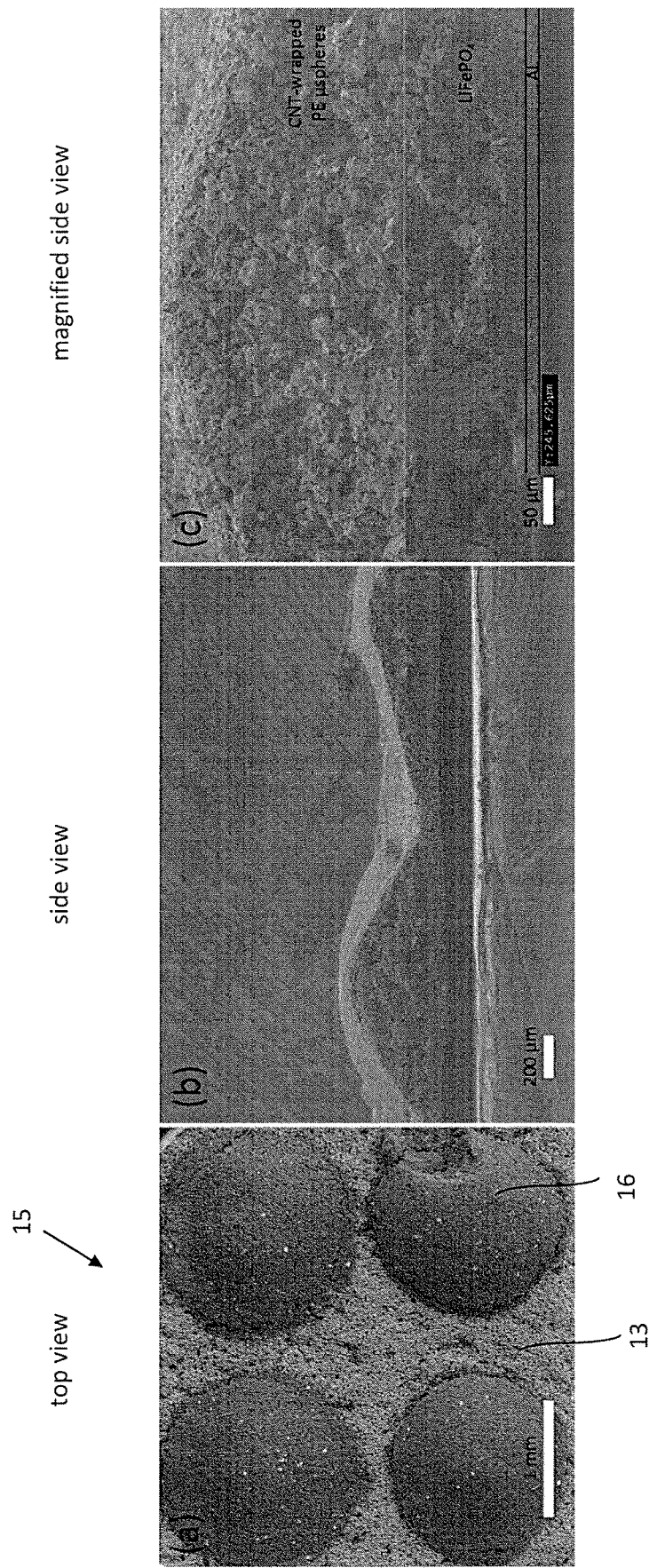
FIG. 11 illustrates a SEM image of a top view of a portion of one of the improved electrodes of FIG. 7.
FIG. 12 illustrates a SEM image of a side view of the improved electrode portion of FIG. 11.
FIG. 13 illustrates a SEM image of the side view of the improved electrode portion of FIG. 12 at a higher magnification.
Figures 14, 15, 16:
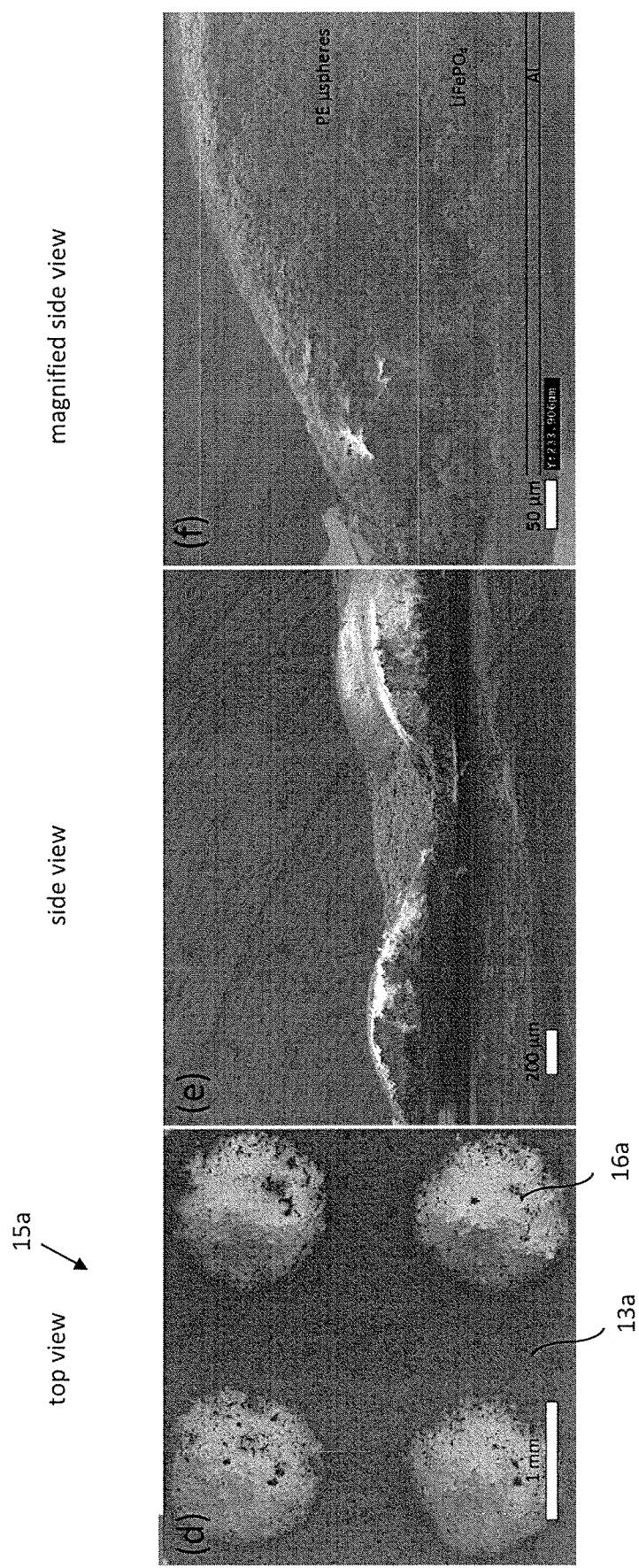
FIG. 14 illustrates a SEM image of a top view of a portion of one of the electrodes of FIG. 8.
FIG. 15 illustrates a SEM image of a side view of the electrode portion of FIG. 14.
FIG. 16 illustrates a SEM image of the side view of the electrode portion of FIG. 15 at a higher magnification.
Figures 17, 18:
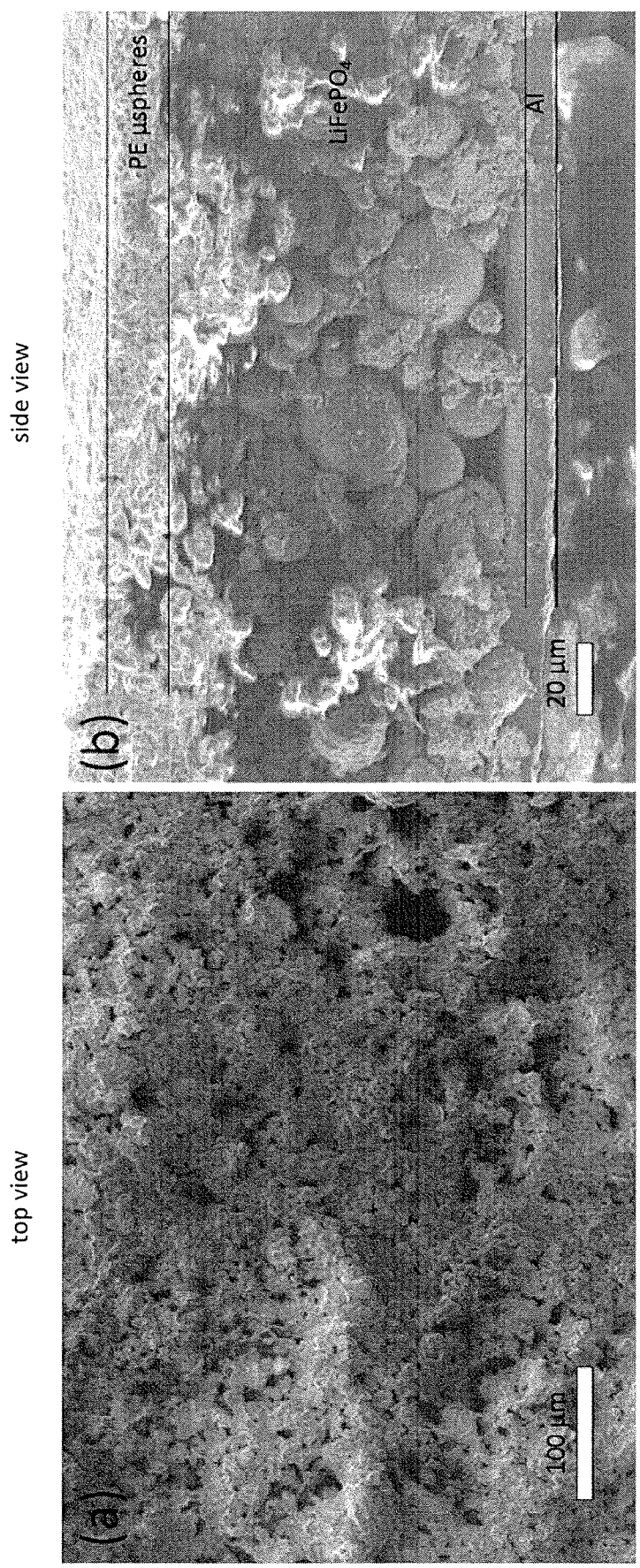
FIG. 17 illustrates a SEM image of a top view of a portion of one of the electrodes of FIG. 10.
FIG. 18 illustrates a SEM image of a side view of the electrode portion of FIG. 17.
Figures 19, 20:
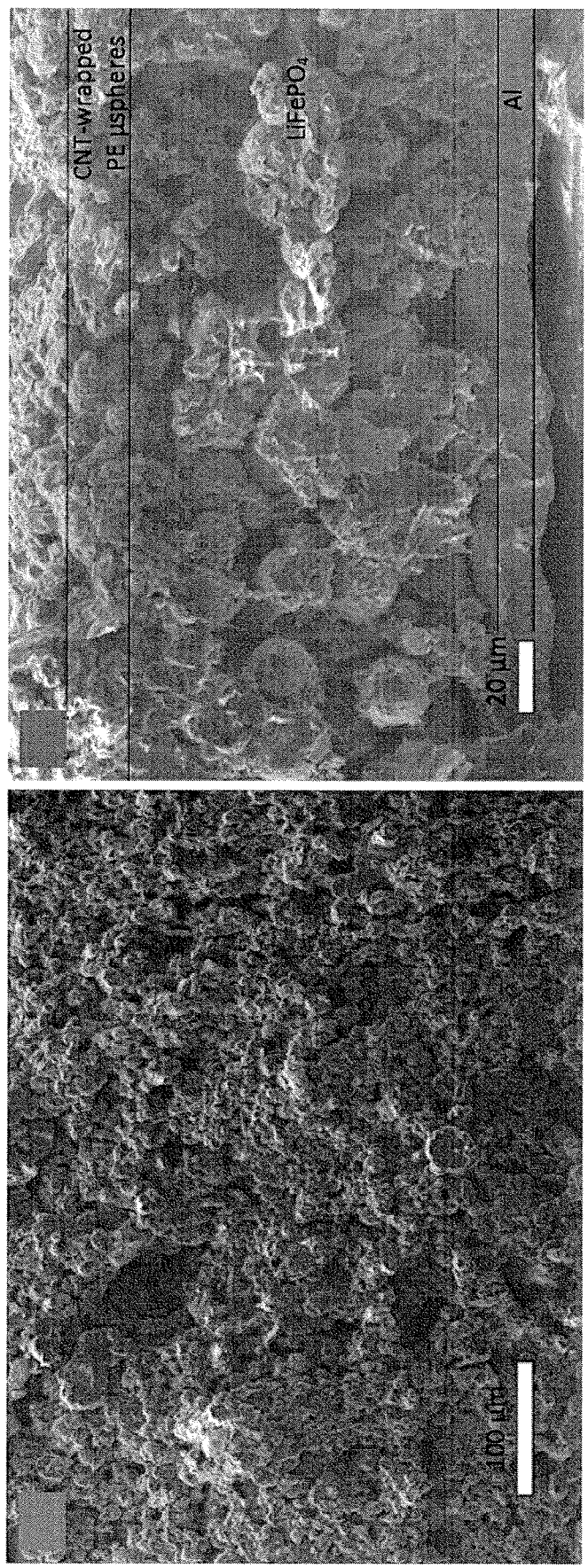
FIG. 19 illustrates a SEM image of a top view of a portion of one of the electrodes of FIG. 9.
FIG. 20 illustrates a SEM image of a side view of the electrode portion of FIG. 19.

FIGS. 11, 12, and 13 show SEM images of electrodes with the PE-CNT additive dots that are deposited using the 3D print technique while FIGS. 14, 15, and 16 show SEM images of electrodes with the PE additive dots that are deposited using the 3D print technique.

As seen in these figures, size of the PE-CNT additive dots and the PE additive dots is estimated to be approximately 1 millimetre wide and approximately 250 micrometers in height.

As seen in FIGS. 17, 18, 19, and 20, the additives, which are deposited with the drop casting method, cover an entire surface of the electrode. This can result in electrolyte wetting and the additives severely hindering flow of lithium ions between the electrodes of the battery.

Steps of activating the shutdown of the battery are described below.

Figure 21:
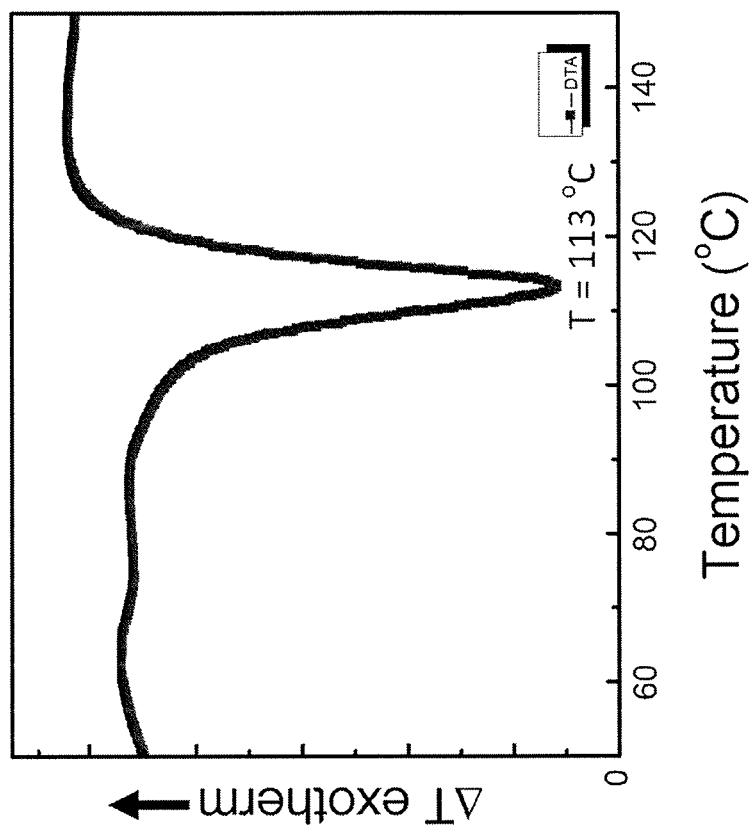
FIG. 21 illustrates a differential thermal analysis (DTA) curve of PE microspheres.

Melting point of the PE microspheres is determined to be about 113 degree Celsius using differential thermal analysis (DTA), which is shown in FIG. 21. This melting temperature indicates that the PE microspheres are suitable for use as a shutdown additive as the melting temperature of the PE microspheres is above operating temperatures of lithium ion batteries. The melting temperature is also well below a critical temperature—approximately 150 degree Celsius—of thermal runaway events.

The shutdown performance of the coin cells, which are loaded with different additives, can be verified by immersing the coin cells into a heated oil bath, which contains 0.5 liters of oil, at 120 degree Celsius, while the coin cells are undergoing charge-discharge cycling.

In detail, a battery tester is programmed to charge and discharge coin cells between a voltage of 2 to 4 volts at 1 C rate for 5 cycles. The 1 C rate refers to a discharge current that discharges the battery in 1 hour.

The tester then performs charging and discharging of the coin cells at 1 C rate at room temperature to ensure that the coil cells are in good operating condition.

The coin cells are later immersed in the heated oil bath. After this, the tester performs charging and discharging of the coin cells, when the coin cells are still immersed in the heated oil bath.

Figure 22:
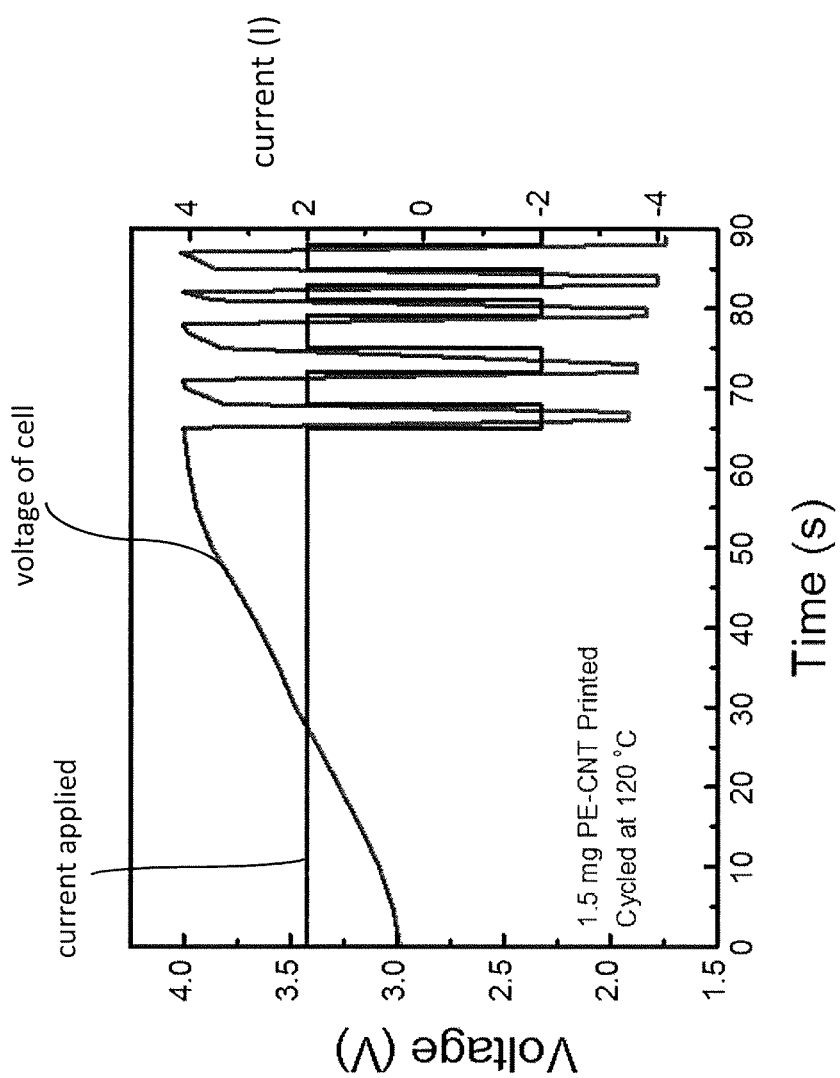
FIG. 22 illustrates a cycling profile at 120 degree Celsius of a coin cell with an electrode that is deposited with 1.5 mg/cm$^2$ of PE-CNT microspheres, using the 3D printing technique.

For coin cells that have its lithium iron phosphate (LiFePO4) electrode being loaded with PE-CNT additive by printing, after the coin cells are immersed in the heated oil bath and the coin cells are charged and discharged for about 65 seconds, a shutdown of the coin cells occurs, after which the cell can no longer operate. This is shown to FIG. 22.

Figure 23:
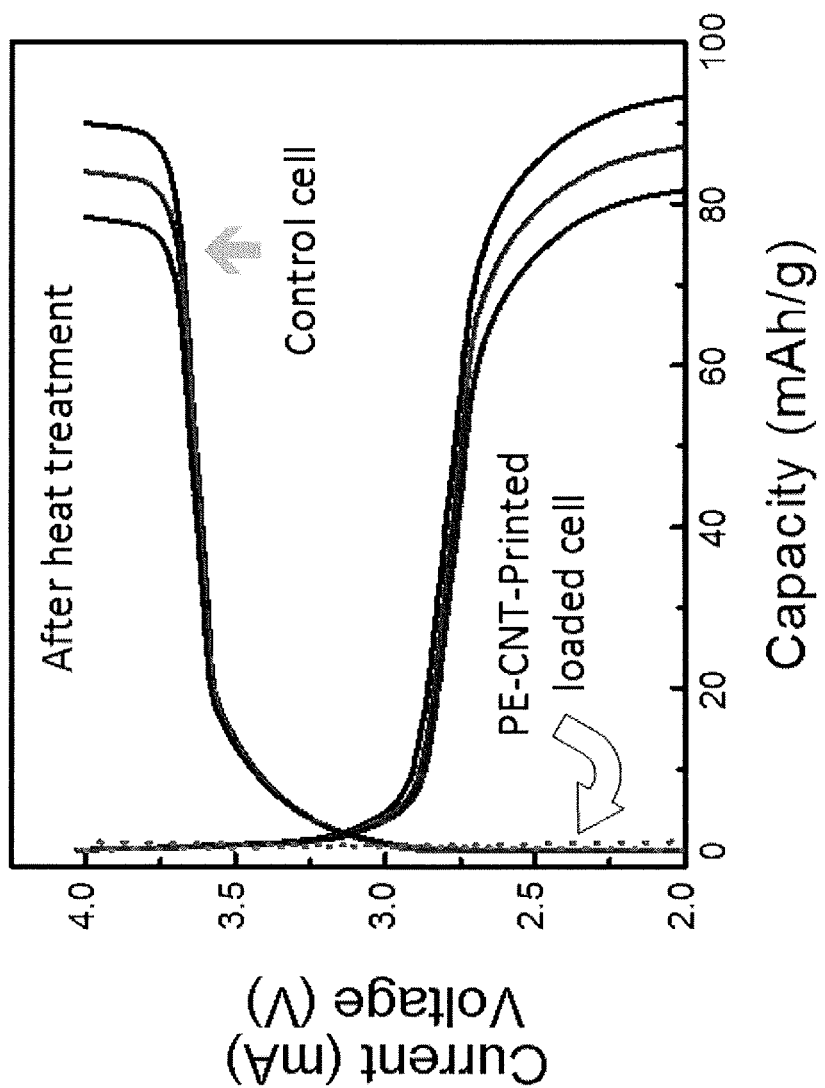
FIG. 23 illustrates several charge and discharge cycling profiles of a coin cell with the electrode of FIG. 7 and of a control cell that is not loaded with shutdown additive, after a heat treatment at 120 degree Celsius.

A verification is then performed to ensure that the additive loaded cell has permanently shut down. Referring to FIG. 23, a control coin cell, which does not have any added additive, continues to operate while the coin cell, which is loaded with PE-CNT additive by printing on the lithium iron phosphate (LiFePO4) electrode, does not function.

Figure 24:
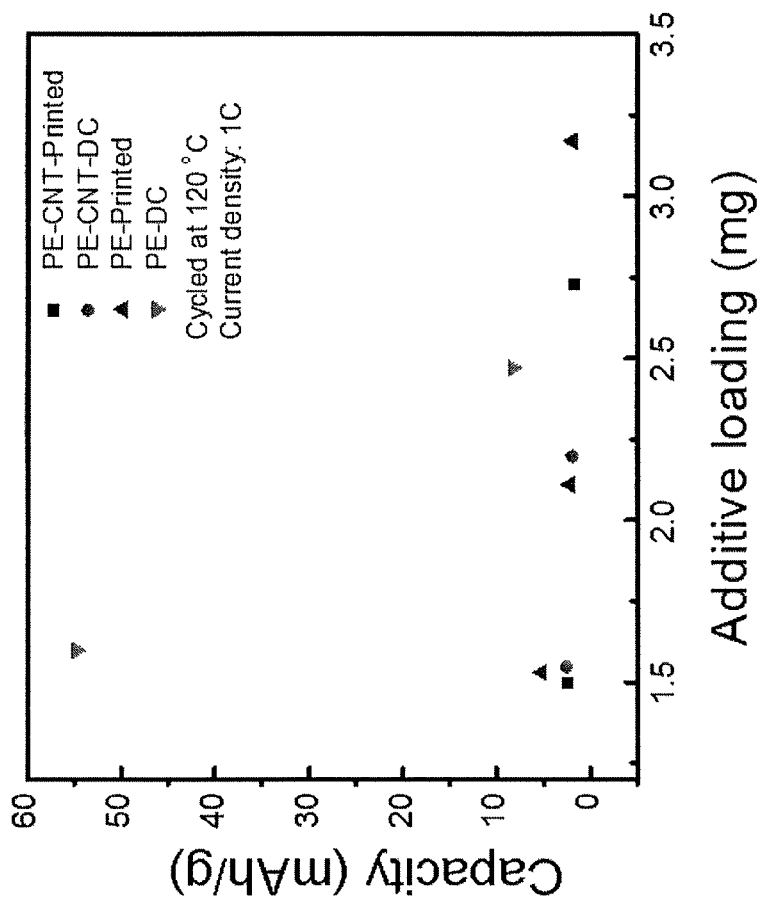
FIG. 24 illustrates discharge capacities of coin cells with electrodes that are deposited with different shutdown additives and with different loading amounts, wherein the coin cells are cycled at 120 degree Celsius.
Figure 26:
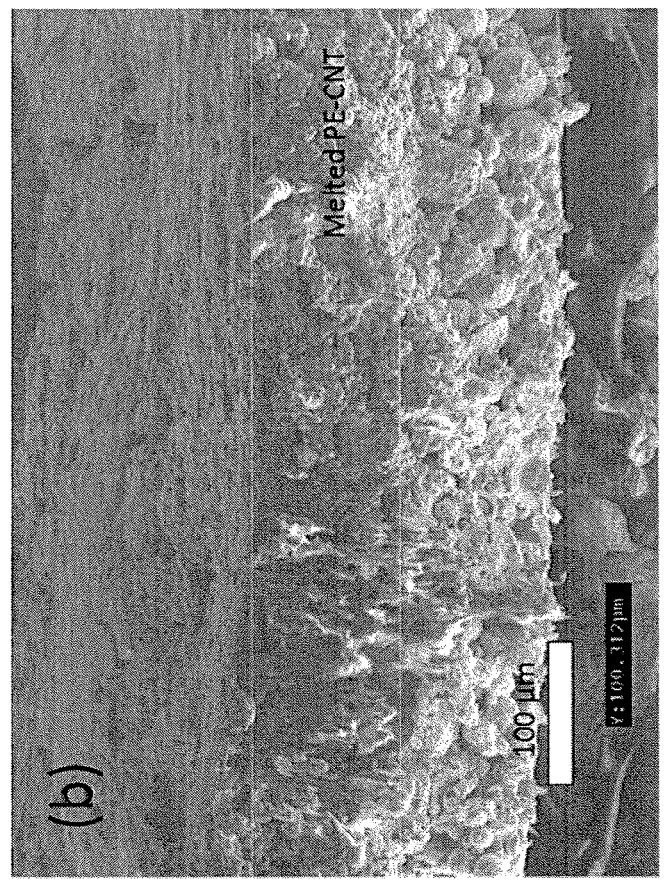
FIG. 26 illustrates a SEM image of a side view of the melted PE-CNT microspheres of FIG. 25.
Figure 25:
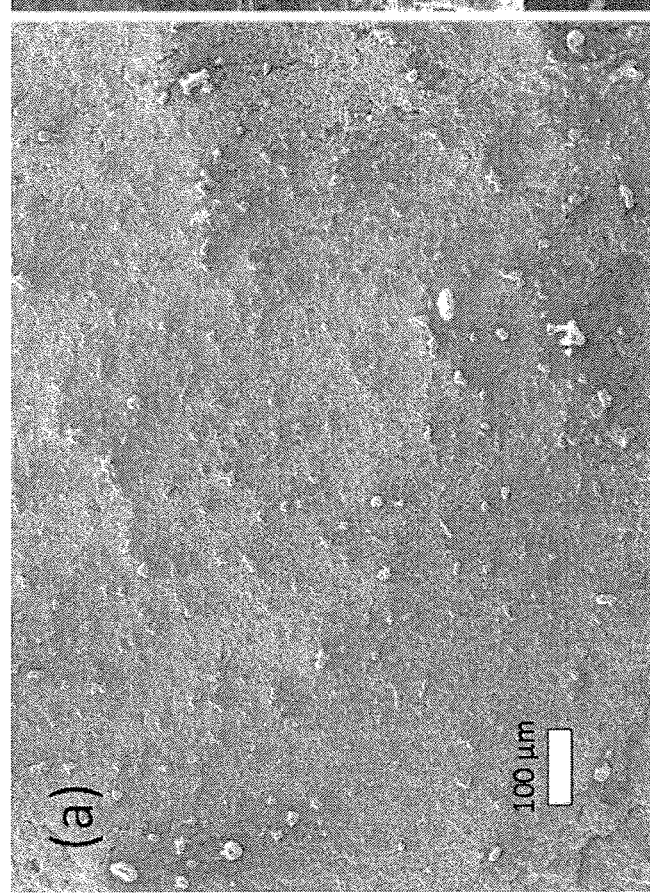
FIG. 25 illustrates a SEM image of a top view of melted PE-CNT microspheres of the electrode of FIG. 7 at 120 degree Celsius.
Figures 27, 28:
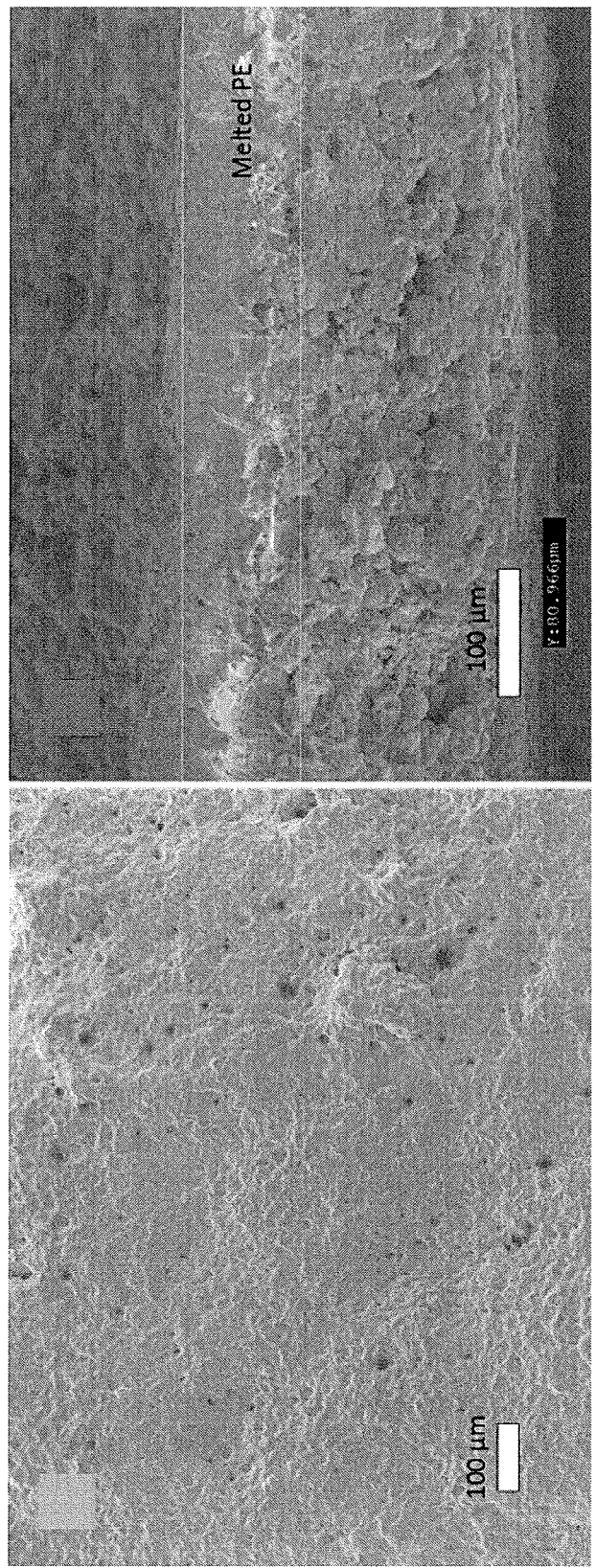
FIG. 27 illustrates a SEM image of a top view of a portion of the electrode of FIG. 8.
FIG. 28 illustrates a SEM image of a side view of the electrode portion of FIG. 27.

FIGS. 24 and 31 show a summary of the shutdown performance of the coin cells, which are loaded with different additives and with different amounts of additive. These figures show that electrodes, which are loaded with PE-CNT additive either by printing or by drop casting, can shut down with a lower loading amount of approximately 1.5 milligrams of additive.

It is also noted that due to optimised or improved coating, the electrode, which is loaded with 1.5 milligrams of PE-CNT additive by printing, is able to shutdown faster at a shutdown time of 65 seconds than the electrode, which is loaded with 1.5 milligrams of PE-CNT additive by drop casting, the battery has a shutdown time of about 75 seconds. On the other hand, the electrode with a loaded amount of 1.5 milligrams of PE additive by drop casting, the battery is still able to hold some charge.

The PE-CNT loaded electrodes has reduced shutdown time as compared to the PE loaded electrodes. This can be attributed to the improved thermal conductivity, because of the CNT. As an example, the shutdown times of the electrodes that are loaded with 1.5 milligrams/cm$^2$ of PE-CNT additive are not more than 75 seconds. This is substantially shorter than the shutdown times of the electrodes that are loaded with 1.5 milligrams/cm$^2$ to 1.5 milligrams/cm$^2$ of PE additive, which are more than 121 seconds.

FIGS. 25, 26, 27, and 28 show a post-mortem analysis of the additive loaded electrodes after 120-degree Celsius cycling. For electrodes, which are loaded either with the PE-CNT additive or with the PE additive using printing, the originally porous PE microspheres melt to form a film to cover the entire surface of the electrodes. The film, which is an insulating layer, effectively blocks ion transport between the electrodes of the battery and hence shut down the battery.

Steps of electrochemical characterization of lithium ion batteries with and without shutdown polymer are described below.

To assess influence of the additives on operation of the lithium ion battery, charge-discharge cycling of the batteries can be performed with increasing C-rates. The sampled coin cells are selected based on the loading amount of the additive on the electrodes, at which effective shutdown of the battery is observed.

These samples include
 a PE-CNT-printed (1.5 mg) electrode, which is loaded with 1.5 milligrams of PE-CNT additive by printing,
 a PE-CNT-DC (1.5 mg) electrode, which is loaded with 1.5 milligrams of PE-CNT additive by drop casting,
 a PE-printed (2 mg) electrode, which is loaded with 2 milligrams of PE additive by printing, and
 a PE-DC (2.5 mg) electrode, which is loaded with 2.5 milligrams of PE additive by drop casting.

Figure 29:
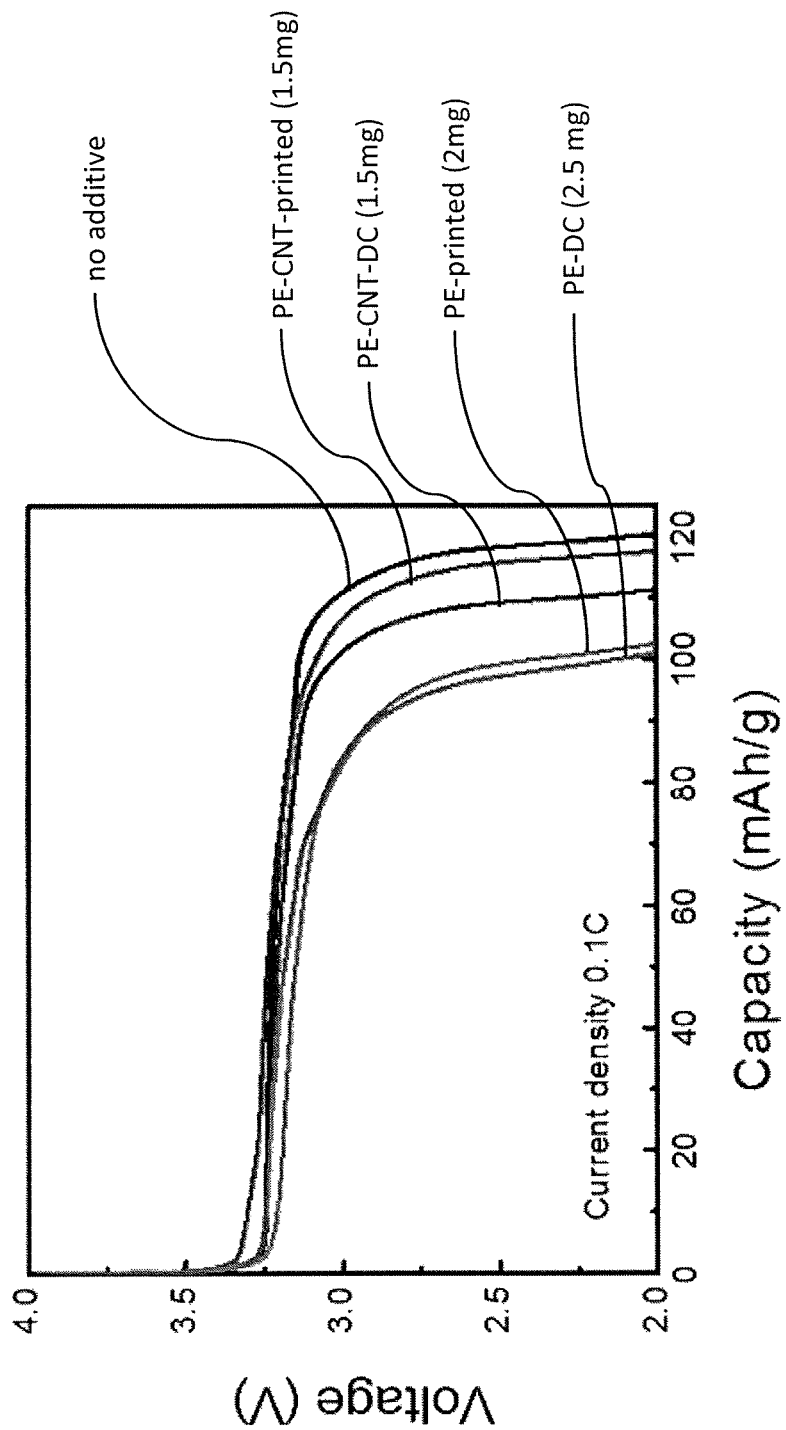
FIG. 29 illustrates first cycle discharge curves of coin cells which are selected from the coin cells of FIG. 24 and of the control cell of FIG. 23.
Figure 30:
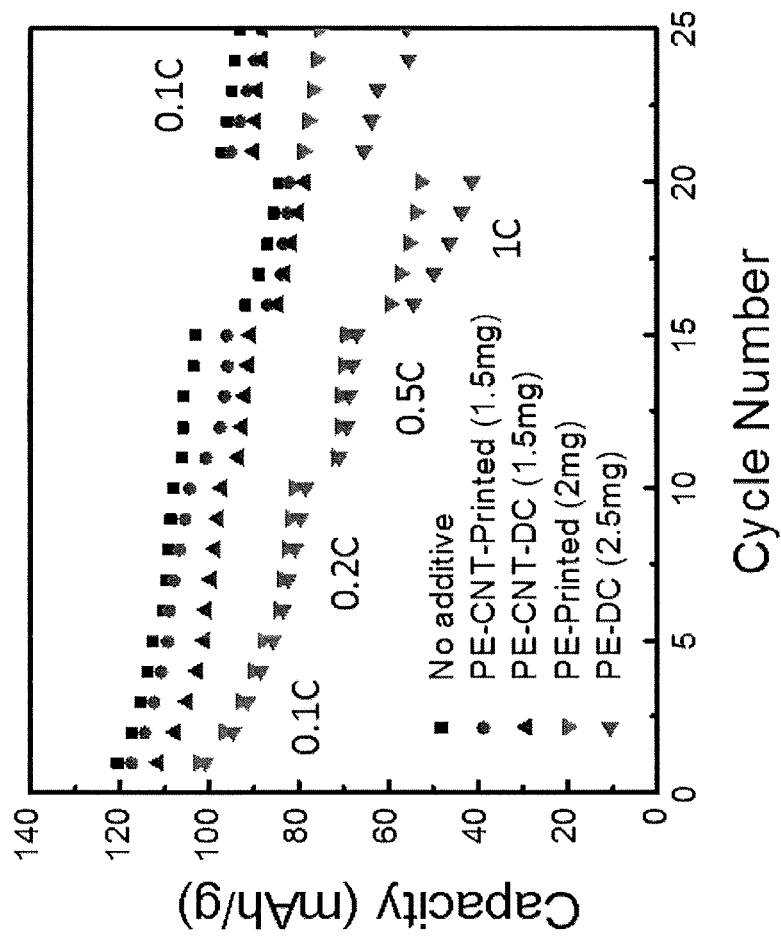
FIG. 30 illustrates a graph of rate cycling performance of the coin cells and the control cell of FIG. 29.

FIG. 29 shows cycle discharge profiles of these sampled coin cells while FIG. 30 shows capacities at different C-rates of these sampled coin cells. Even at high current densities of 1 C, the PE-CNT-printed electrode has the least detrimental effect on the capacity of the coin cell. The significant reduction in capacities of the electrodes that are loaded with PE additive, can be attributed to poor conductivity of the PE and higher loading of the PE additive.

Electrochemical Impedance spectroscopy measurements are also collected for these samples at both room temperature and after high temperature testing.

Referring to FIG. 32, at room temperature, impedance of the coin cells with loaded additives increases as compared to impedance of the control cell, which does not have any added additive. The coin cell with the PE-DC (2.5 mg) electrode has the highest increase in impedance. This is consistent with the highest reduction in battery capacity of this coin cell compared to the control cell, as seen in FIG. 29.

After heating to 120 degree Celsius, impedance of these additive loaded coin cells increase by almost tenfold as compared to impedance of the control cell, which increases by less than 3 times. The substantial increase in the impedance of the additive loaded coin cells validates a shutdown mechanism of the shutdown additive, wherein the PE microspheres melt to create an insulating film that prevents ion transport between the electrodes of the battery.

In conclusion, the additive of CNT-wrapped PE microspheres can successfully mitigate the intrinsically electrically insulating effect of PE. In other words, introduction of such an additive can reduce the capacity loss of the battery.

Moreover, the thermally conductive carbon nanotubes (CNT) enable reduction in shutdown time of PE-CNT loaded electrodes as compared to PE loaded electrodes.

Using the printing technique, which enables precise deposition of a predetermined amount of additive onto the electrode, further reduces the shutdown time of the battery 1 as compared to the deposition technique of drop casting.

In short, the improved lithium ion battery 1 provides several benefits.

The electrode with conductive carbon nanotubes (CNT) wrapped PE additive allows the battery to have reduced internal impedance. The electrode with CNT wrapped PE additive can also provide a shorter shutdown time when thermal runaway is about to occur, while also providing little impact on battery performance.

The printing technique enables precise deposition of the additive on the electrode. The printing technique also enables the additive to be deposited onto the electrode in a pattern of regular arrays.

Although the above description contains much specificity, this should not be construed as limiting the scope of the embodiments but merely providing illustration of the foreseeable embodiments. The above stated advantages of the embodiments should not be construed especially as limiting the scope of the embodiments but merely to explain possible achievements if the described embodiments are put into practice. Thus, the scope of the embodiments should be determined by the claims and their equivalents, rather than by the examples given.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE NUMBERS 1 lithium ion battery
10 cathode
13 electrode active material
15 shutdown separator
16 additive dots
30 anode
50 membrane
60 electrolyte
100 flow chart
110 step
120 step
130 step
140 step

The invention claimed is:

1. A lithium (Li) ion battery comprising:
a first electrode with a second electrode; and
a shutdown polymer additive on an outer surface of the first electrode,
wherein the shutdown polymer additive comprises at least two additive dots, each of the additive dots comprising a plurality of polyethylene microspheres,
wherein each of the polyethylene microspheres is wrapped with carbon nanotubes,
wherein the polyethylene microspheres interconnect with each other such that the carbon nanotubes form a conductive network,
wherein the additive dots are arranged at predetermined areas of the outer surface of the first electrode, and
wherein the shutdown polymer additive provides:
an operating mode, in which:
a temperature of the battery is below a melting temperature of the polyethylene, and
the conductive network allows Li ions to pass through the network to move between the first electrode and the second electrode, and
a shutdown mode, in which:
the temperature of the battery is at or above the melting temperature of the polyethylene, and
the additive dots can melt to form essentially one insulating film, which prevents the Li ions from moving between the first electrode and the second electrode.

2. The Li ion battery according to claim 1, wherein the additive dots are separated from each other by a predetermined distance.

3. The Li ion battery according to claim 1, wherein the first electrode comprises a cathode.

4. The Li ion battery according to claim 1, wherein the first electrode comprises an anode.

5. The Li ion battery according to claim 1, wherein one or more of the additive dots comprise a shape of a disc.

6. The Li ion battery according to claim 5, wherein the additive dots are arranged in an array.

7. The Li ion battery according to claim 1, wherein one or more of the additive dots comprise a binder for fastening the polyethylene microspheres together.

8. The Li ion battery according to claim 7, wherein the binder comprises polyvinylidene fluoride.

9. A method for producing a lithium (Li) ion battery, the method comprising:
providing a first electrode and a second electrode;
providing a shutdown polymer additive;
loading the shutdown polymer additive into a syringe;
moving the syringe with a programmable robotic arm; and
depositing a predetermined amount of the shutdown polymer additive on at least two predetermined positions of an active outer surface of the first electrode of the Li ion battery,
wherein the predetermined positions are selected such that, in a shutdown mode, the shutdown polymer additive forms essentially one insulating film for preventing Li ions from moving between the first electrode and the second electrode.

10. The method according to claim 9, wherein the shutdown polymer additive is provided by:
forming polyethylene microspheres from polyethylene pellets using solvent evaporation;
treating surfaces of the polyethylene microspheres with oxygen plasma for reducing a hydrophobicity thereof;
coating the polyethylene microspheres with a positively charged functional group; and
coating the positively charged polyethylene microspheres with negatively charged carbon nanotubes (CNT-COOH).

11. The method according to claim 10, wherein providing the shutdown polymer additive further comprises treating the carbon nanotubes with carboxylic acid.

12. The method according to claim 10, wherein the polyethylene microspheres interconnect with each other such that the carbon nanotubes form a conductive network.

13. The method according to claim 9, wherein:
depositing the predetermined amount of the shutdown polymer additive comprises forming at least two polyethylene layers, each of which comprises a plurality of polyethylene microspheres;
each of the polyethylene microspheres is wrapped with carbon nanotubes;
the polyethylene microspheres interconnect with each other such that the carbon nanotubes form a conductive network;
the shutdown polymer additive provides an operating mode, in which:
a temperature of the battery is below a melting temperature of the polyethylene, and
the conductive network allows the lithium ions to pass through the network to move between the first electrode and the second electrode, and
in the shutdown mode, the temperature of the battery is at or above the melting temperature of the polyethylene.

14. The method according to claim 13, wherein the polyethylene layers are separated from each other by a predetermined distance.

15. The method according to claim 13, wherein one or more of the polyethylene layers comprise a shape of a disc.

16. The method according to claim 15, wherein the polyethylene layers are arranged in an array.

17. The method according to claim 13, wherein one or more of the polyethylene layers comprise a binder for fastening the polyethylene microspheres together.

18. The method according to claim 17, wherein the binder comprises polyvinylidene fluoride.

19. The method according to claim 9, wherein the first electrode comprises a cathode and/or an anode.

20. The method according to claim 9, wherein:
depositing the predetermined amount of the shutdown polymer additive comprises forming at least two additive dots on the active outer surface of the first electrode of the Li ion battery, each of the additive dots comprising a plurality of polyethylene microspheres,
each of the polyethylene microspheres is wrapped with carbon nanotubes;
the polyethylene microspheres interconnect with each other such that the carbon nanotubes form a conductive network;
the shutdown polymer additive provides an operating mode, in which:
a temperature of the battery is below a melting temperature of the polyethylene, and
the conductive network allows the lithium ions to pass through the network to move between the first electrode and the second electrode, and
in the shutdown mode, the temperature of the battery is at or above the melting temperature of the polyethylene.

* * * * *